United States Patent
Miyoshi

(10) Patent No.: US 11,780,293 B2
(45) Date of Patent: Oct. 10, 2023

(54) IN-VEHICLE TEMPERATURE CONTROL SYSTEM

(71) Applicant: TOYOTA JIDOSHA KABUSHIKI KAISHA, Aichi-ken (JP)

(72) Inventor: Yuji Miyoshi, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/720,308

(22) Filed: Apr. 14, 2022

(65) Prior Publication Data

US 2022/0371403 A1    Nov. 24, 2022

(30) Foreign Application Priority Data

May 19, 2021    (JP) .................................. 2021-084848

(51) Int. Cl.
*B60H 1/03*    (2006.01)
*B60H 1/00*    (2006.01)

(52) U.S. Cl.
CPC ........... *B60H 1/03* (2013.01); *B60H 1/00885* (2013.01)

(58) Field of Classification Search
CPC .... B60H 1/03; B60H 1/00885; B60H 1/3227; B60H 1/32284; B60H 1/04; B60H 1/00899
See application file for complete search history.

(56) References Cited

U.S. PATENT DOCUMENTS

| | | | |
|---|---|---|---|
| 2015/0115048 A1* | 4/2015 | Brodie | B60H 1/00807 237/12.3 B |
| 2016/0082805 A1* | 3/2016 | Graaf | B60H 1/04 62/238.7 |
| 2017/0368911 A1 | 12/2017 | Okamoto | |
| 2018/0339574 A1* | 11/2018 | Sugimura | B60H 1/323 |
| 2020/0317026 A1 | 10/2020 | Kitamura et al. | |

FOREIGN PATENT DOCUMENTS

| | | | |
|---|---|---|---|
| JP | 2016130045 A | 7/2016 | |
| JP | 6015184 B2 * | 10/2016 | ......... B60H 1/00885 |
| JP | 2020168950 A | 10/2020 | |

* cited by examiner

Primary Examiner — Jenna M Hopkins
(74) Attorney, Agent, or Firm — HAUPTMAN HAM, LLP

(57) ABSTRACT

An in-vehicle temperature control system includes a refrigeration circuit including an inter-media heat exchanger that dissipates heat from a refrigerant to a heat medium, the refrigeration circuit being configured to realize a refrigeration cycle, and a heat circuit including a heater core, the inter-media heat exchanger, and an engine heat circuit. The heat circuit includes an adjusting valve. When heating is performed by using heat obtained by the refrigeration cycle, the adjusting valve is controlled to a first state where the heat medium flows into the heater core from the inter-media heat exchanger, and when heating is performed by using heat obtained by an internal combustion engine, the adjusting valve is controlled to a second state where the heat medium flows into the heater core from the engine heat circuit.

5 Claims, 12 Drawing Sheets

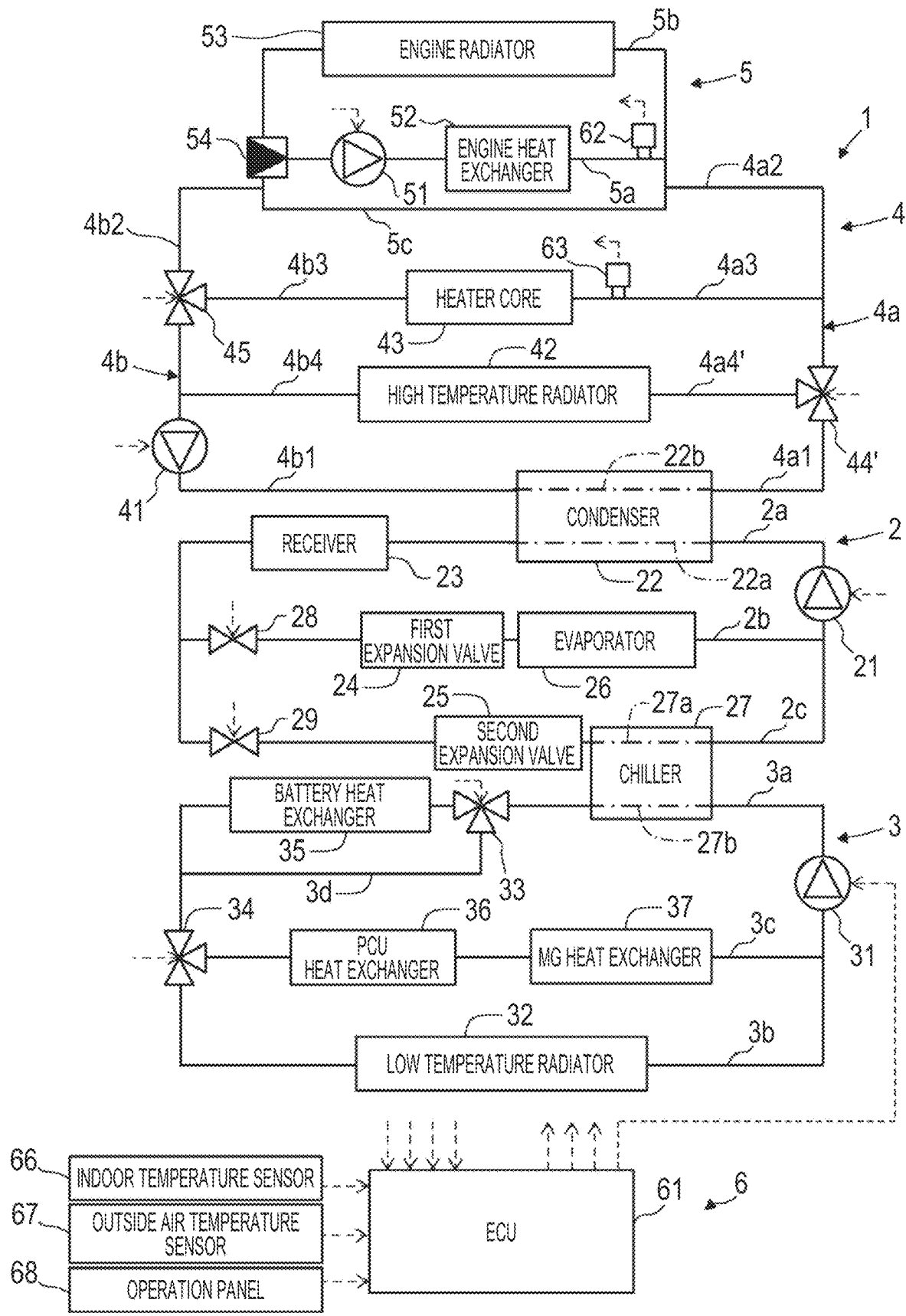

IN-VEHICLE TEMPERATURE CONTROL SYSTEM

CROSS-REFERENCE TO RELATED APPLICATION

This application claims priority to Japanese Patent Application No. 2021-084848 filed on May 19, 2021, incorporated herein by reference in its entirety.

BACKGROUND

1. Technical Field

The present disclosure relates to an in-vehicle temperature control system.

2. Description of Related Art

In the related art, an in-vehicle temperature control system that can perform two modes of heating, heating performed by heating coolant flowing into a heater core due to exhaust heat of an internal combustion engine (exhaust heat heating) and heating performed by heating such coolant by using a heat pump (HP heating), is known (Japanese Unexamined Patent Application Publication No. 2020-168950 (JP 2020-168950 A) and Japanese Unexamined Patent Application Publication No. 2016-130045 (JP 2016-130045 A)).

In particular, the in-vehicle temperature control system disclosed in JP 2020-168950 A includes a heat circuit configured to allow the coolant to circulate through an inter-media heat exchanger that exchanges heat with a refrigerant of the heat pump, and the heater core. In addition, in the in-vehicle temperature control system, an outlet of an engine heat exchanger that exchanges heat with the internal combustion engine communicates with a flow path of the heat circuit on a downstream side of the heater core and an upstream side of the inter-media heat exchanger, and a flow path of the heat circuit on a downstream side of the inter-media heat exchanger and an upstream side of the heater core, and a switching valve allows the outlet of the engine heat exchanger to selectively communicate with any one of the two flow paths.

SUMMARY

Although the in-vehicle temperature control system disclosed in JP 2020-168950 A can perform two modes of heating as described above, the in-vehicle temperature control system has a complicated configuration in which the outlet of the engine heat exchanger is configured to selectively communicate with an upstream side and a downstream side of the heater core.

In view of the above problems, the present disclosure is to provide an in-vehicle temperature control system having a simple configuration in which two modes of heating can be performed.

The gist of the present disclosure is as follows.

(1) An aspect of the present disclosure relates to an in-vehicle temperature control system including a refrigeration circuit, a heat circuit, and a control device. The refrigeration circuit includes an inter-media heat exchanger that dissipates heat from a refrigerant to a heat medium and condenses the refrigerant, and an evaporator that allows the refrigerant to absorb heat and evaporates the refrigerant. The refrigeration circuit is configured to realize a refrigeration cycle by allowing the refrigerant to circulate through the inter-media heat exchanger and the evaporator. The heat circuit includes a heater core used for heating a vehicle cabin, the inter-media heat exchanger, and an engine heat circuit. The heat circuit is configured to allow the heat medium to circulate through the heater core, the inter-media heat exchanger, and the engine heat circuit. The control device is configured to control a flow state of the heat medium in the heat circuit. The engine heat circuit is configured to allow the heat medium to flow through an engine heat exchanger that exchanges heat with an internal combustion engine without passing through the heater core and the inter-media heat exchanger. The heat circuit includes a first communication path communicating with the engine heat circuit on a downstream side of the engine heat exchanger, an outlet of the inter-media heat exchanger, and an inlet of the heater core, and allowing the heat medium to flow from the engine heat circuit and the inter-media heat exchanger into the heater core, a second communication path communicating with the engine heat circuit on an upstream side of the engine heat exchanger, an inlet of the inter-media heat exchanger, and an outlet of the heater core, and allowing the heat medium to flow from the heater core into the engine heat circuit and the inter-media heat exchanger, and an adjusting valve configured to adjust a ratio of a flow rate of a heat medium, among the heat media flowing into the heater core, flowing out of the inter-media heat exchanger and flowing into the heater core through the first communication path and a flow rate of a heat medium flowing out of the engine heat circuit and flowing into the heater core through the first communication path. The control device is configured to, when a first heating condition that heating by the heater core is performed by using heat obtained by the refrigeration cycle is satisfied, control the adjusting valve to a first state where the heat medium does not flow into the heater core from the engine heat circuit and the heat medium flows into the heater core from the inter-media heat exchanger, and when a second heating condition that heating by the heater core is performed by using heat obtained by the internal combustion engine is satisfied, control the adjusting valve to a second state where the heat medium does not flow into the heater core from the inter-media heat exchanger and the heat medium flows into the heater core from the engine heat circuit.

(2) In the in-vehicle temperature control system according to (1), the control device may be configured to, when the adjusting valve is switched from the first state to the second state, control the adjusting valve such that the ratio of the flow rate of the heat medium, among the heat media flowing into the heater core, flowing out of the engine heat circuit to the flow rate of the heat medium flowing out of the inter-media heat exchanger is increased stepwise or continuously.

(3) In the in-vehicle temperature control system according to (2), the control device may be configured to control the adjusting valve such that the ratio of the flow rate of the heat medium, among the heat media flowing into the heater core, flowing out of the engine heat circuit to the flow rate of the heat medium flowing out of the inter-media heat exchanger is increased as a difference between a temperature of the heat medium at the inlet of the heater core and a temperature of the heat medium in the engine heat circuit is decreased.

(4) In the in-vehicle temperature control system according to any one of (1) to (3), the second communication path may include a third path communicating with the outlet of the heater core, and a first path and a second path communicating with the third path, and communicating with the inlet of the inter-media heat exchanger and the engine heat circuit, respectively, and the adjusting valve may be configured to adjust a ratio of a flow rate of a heat medium flowing into the first path from the third path and a flow rate of a heat medium flowing into the second path from the third path.

(5) In the in-vehicle temperature control system according to any one of (1) to (3), the first communication path may include a fourth path communicating with the outlet of the inter-media heat exchanger, a fifth path communicating with the engine heat circuit, and a sixth path communicating with the fourth path and the fifth path, and communicating with the inlet of the heater core, and the adjusting valve may be configured to adjust a ratio of a flow rate of a heat medium flowing into the sixth path from the fourth path and a flow rate of a heat medium flowing into the sixth path from the fifth path.

According to the present disclosure, the in-vehicle temperature control system having a simple configuration in which two modes of heating can be performed is provided.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 12 is a configuration diagram schematically showing the in-vehicle temperature control system according to a second modification example.

DETAILED DESCRIPTION OF EMBODIMENTS

Figure 1:
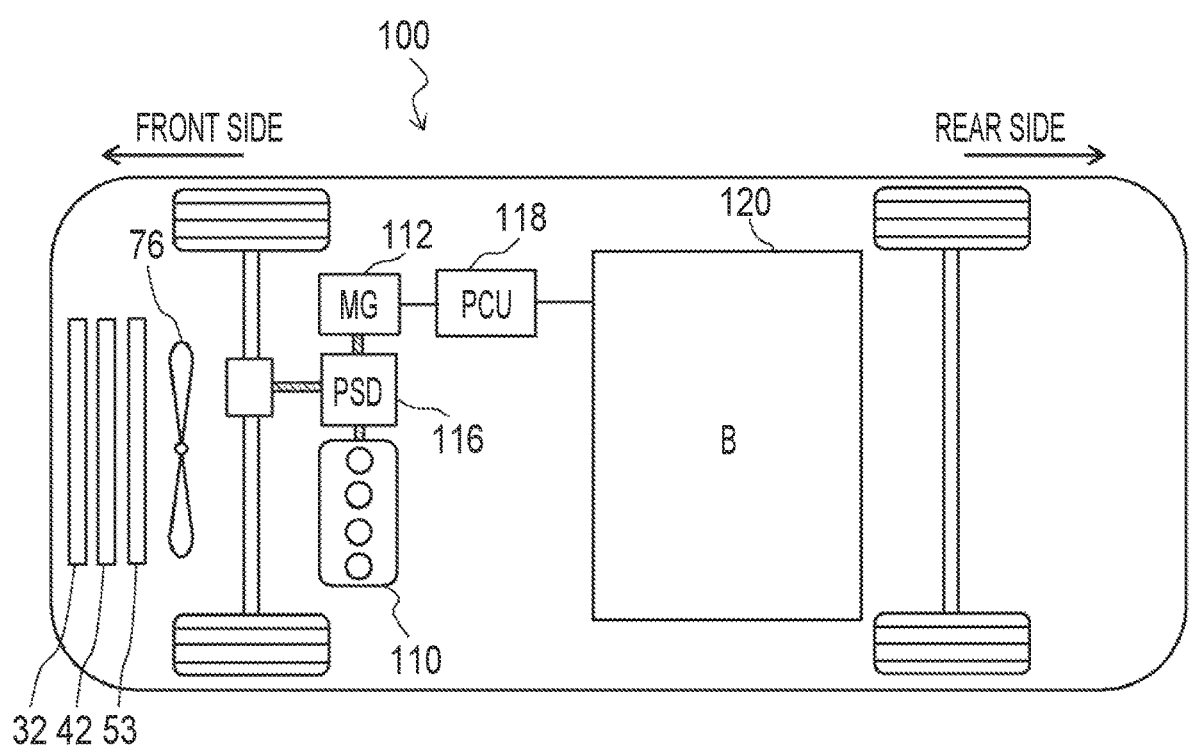
FIG. 1 is a diagram schematically showing a configuration of a vehicle equipped with an in-vehicle temperature control system according to an embodiment.

In the following, an embodiment will be described in detail with reference to the drawings. Note that, in the following description, similar components are given the same reference numerals.

Configuration of Vehicle

FIG. 1 is a diagram schematically showing a configuration of a vehicle 100 equipped with an in-vehicle temperature control system 1 according to an embodiment. In FIG. 1, a left side shows a front side of the vehicle 100, and a right side shows a rear side of the vehicle 100. As shown in FIG. 1, the vehicle 100 includes an internal combustion engine 110, a motor generator (MG) 112, and a power split device (PSD) 116. In addition, the vehicle 100 includes a power control unit (PCU) 118 electrically connected to the MG 112 and a battery (B) 120 electrically connected to the PCU 118.

The internal combustion engine 110 is a motor that burns fuel inside an engine and converts the thermal energy of the combustion gas into the mechanical energy. The internal combustion engine 110 is connected to the power split device 116, and the output of the internal combustion engine 110 is used for driving the vehicle 100 or generate electric power in the MG 112.

The MG 112 functions as an electric motor and an electric power generator. The MG 112 is connected to the power split device 116 and is used for driving the vehicle 100 and to perform regeneration when braking the vehicle 100. Note that, in the present embodiment, the MG 112 having an electric power generation function is used as a motor that drives the vehicle 100, but a motor having no electric power generation function may be used.

The PCU 118 is connected between the battery 120 and the MG 112, and controls the electric power supplied to the MG 112. The PCU 118 includes heat-generating components, such as an inverter that drives the motor, a boost converter that controls a voltage, and a DCDC converter that lowers a high voltage. The battery 120 is connected to the PCU 118 and the MG 112, and supplies the electric power for driving the vehicle 100 to the MG 112.

In the present embodiment, the internal combustion engine 110, the MG 112, and the PCU 118 are disposed on the front side of the vehicle 100, that is, the front side of a vehicle cabin. On the other hand, the battery 120 is disposed in a center of the vehicle 100, that is, under the vehicle cabin.

Note that the vehicle 100 may be a vehicle of any aspect as long as the vehicle includes the internal combustion engine 110 and the MG (or motor) 112. Therefore, for example, the vehicle 100 may be configured such that the internal combustion engine is used solely for the electric power generation, and solely the motor drives the vehicle 100. In addition, for example, the vehicle 100 may be configured to include two MGs, an MG mainly used for driving the vehicle 100 and an MG mainly used for the electric power generation.

Configuration of In-Vehicle Temperature Control System

Figure 2:
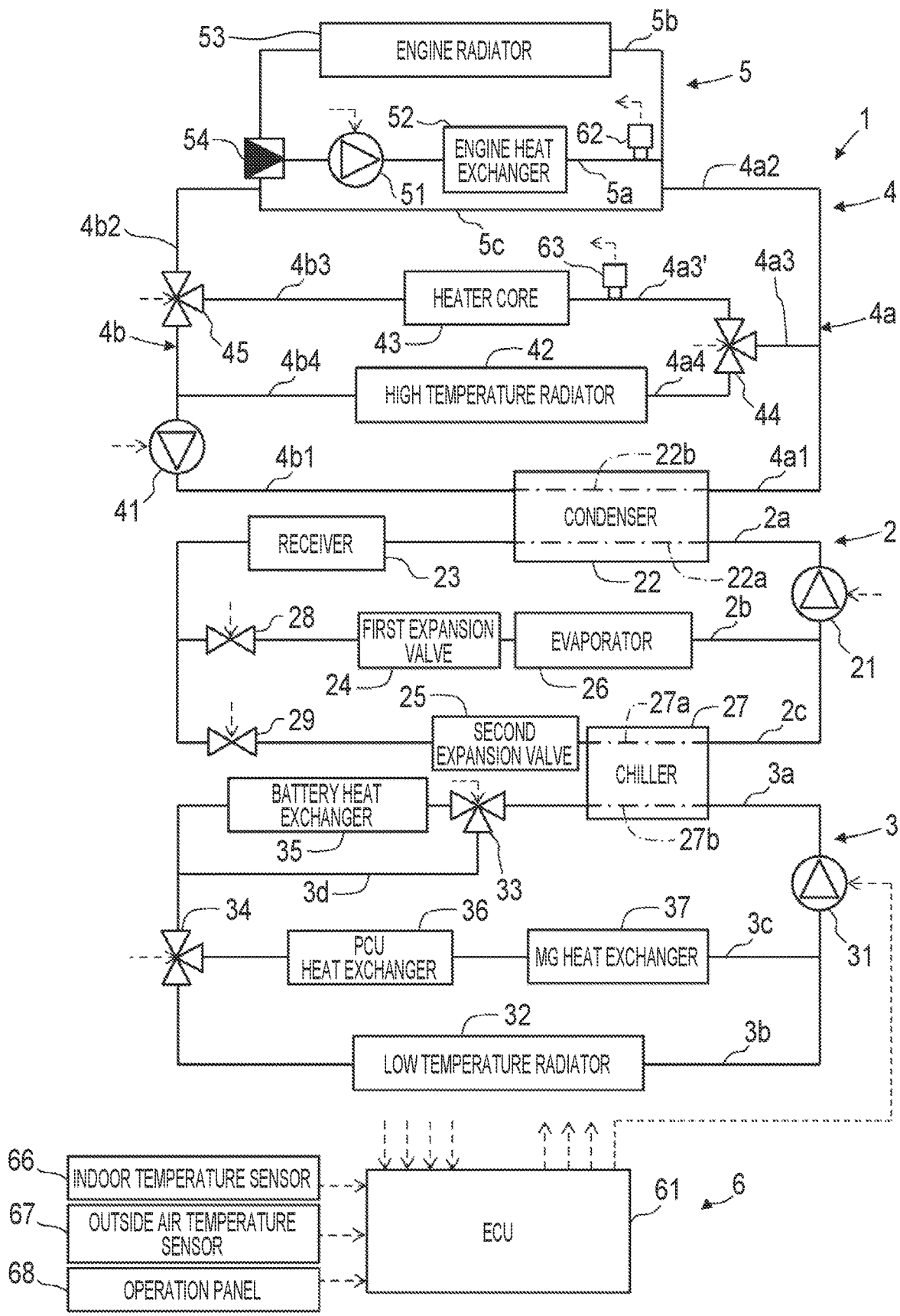
FIG. 2 is a configuration diagram schematically showing the in-vehicle temperature control system according to the embodiment.

A configuration of the in-vehicle temperature control system 1 according to one embodiment will be described with reference to FIGS. 1 to 3D. FIG. 2 is a configuration diagram schematically showing the in-vehicle temperature control system 1. The in-vehicle temperature control system 1 includes a refrigeration circuit 2, a low temperature circuit 3, a high temperature circuit 4, and a control device 6. The refrigeration circuit 2, the low temperature circuit 3, and the high temperature circuit 4 function as heat circuits that exchange the heat with the outside of the circuit.

Refrigeration Circuit

First, the refrigeration circuit 2 will be described. The refrigeration circuit 2 includes a compressor 21, a refrigerant pipe 22a of a condenser 22, a receiver 23, a first expansion valve 24, a second expansion valve 25, an evaporator 26, a refrigerant pipe 27a of a chiller 27, a first electromagnetic adjusting valve 28, and a second electromagnetic adjusting valve 29. The refrigeration circuit 2 is configured to realize a refrigeration cycle by allowing the refrigerant to circulate through these components. As the refrigerant, any material generally used as the refrigerant in the refrigeration cycle, such as hydrofluorocarbon (for example, HFC-134a), is used.

In addition, the refrigeration circuit 2 includes a refrigeration fundamental flow path 2a, an evaporator flow path 2b, and a chiller flow path 2c. The evaporator flow path 2b and the chiller flow path 2c are provided in parallel with each other, and each are connected to the refrigeration fundamental flow path 2a.

In the refrigeration fundamental flow path 2a, the compressor 21, the refrigerant pipe 22a of the condenser 22, and the receiver 23 are provided in this order in a circulation direction of the refrigerant. In the evaporator flow path 2b, the first electromagnetic adjusting valve 28, the first expansion valve 24, and the evaporator 26 are provided in this order in the circulation direction of the refrigerant. In addition, in the chiller flow path 2c, the second electromagnetic adjusting valve 29, the second expansion valve 25, and the refrigerant pipe 27a of the chiller 27 are provided in this order.

The compressor 21 functions as a compressor compressing the refrigerant. In the present embodiment, the compressor 21 is an electric compressor, and is configured such that a discharge capacity thereof is changed in a non-step manner by adjusting the electric power supplied to the compressor 21. In the compressor 21, the refrigerant that flows out of the evaporator 26 or the chiller 27, has a low temperature and a low pressure, and is mainly gaseous is compressed adiabatically to be changed to the refrigerant that has a high temperature and a high pressure and is mainly gaseous.

The condenser 22 includes the refrigerant pipe 22a and a coolant pipe 22b. The condenser 22 functions as an inter-media heat exchanger that dissipates the heat from the refrigerant to the coolant flowing through the coolant pipe 22b of the high temperature circuit 4 to be described below, and condenses the refrigerant. From a different point of view, the condenser 22 functions as a heating unit that heats the coolant of the high temperature circuit 4 by using the heat other than the exhaust heat of the internal combustion engine 110. The refrigerant pipe 22a of the condenser 22 functions as a condenser condensing the refrigerant in the refrigeration cycle. In addition, in the refrigerant pipe 22a of the condenser 22, the refrigerant that flows out of the compressor 21, has a high temperature and a high pressure, and is mainly gaseous is cooled in an isobaric manner to be changed to the refrigerant that has a high temperature and a high pressure and is mainly liquid.

The receiver 23 stores the refrigerant condensed by the refrigerant pipe 22a of the condenser 22. In addition, since the condenser 22 cannot always liquefy all the refrigerant, the receiver 23 is configured to separate air and liquid. Solely the liquid refrigerant from which the gaseous refrigerant is separated flows out of the receiver 23.

The first expansion valve 24 and the second expansion valve 25 function as expanders that expands the refrigerant. The expansion valves 24, 25 includes a path having a small diameter, and a pressure of the refrigerant is sharply decreased by spraying the refrigerant from the path having a small diameter. The first expansion valve 24 sprays the liquid refrigerant supplied from the receiver 23 into the evaporator 26 in a mist-like form. Similarly, the second expansion valve 25 sprays the liquid refrigerant supplied from the receiver 23 into the refrigerant pipe 27a of the chiller 27 in a mist-like form. In the expansion valves 24, 25, the liquid refrigerant having a high temperature and a high pressure and flowing out of the receiver 23 is depressurized and partially vaporized to be changed to a mist-like refrigerant having a low temperature and a low pressure.

The evaporator 26 functions as an evaporator that allows the refrigerant to absorb heat, and evaporates the refrigerant. Specifically, the evaporator 26 allows the refrigerant to absorb the heat from the air around the evaporator 26, and evaporates the refrigerant. Therefore, in the evaporator 26, by evaporation, the mist-like refrigerant having a low temperature and a low pressure and flowing out of the first expansion valve 24 is changed to a gaseous refrigerant having a low temperature and a low pressure. As a result, the air around the evaporator 26 is cooled, and cooling of the vehicle cabin can be performed.

The chiller 27 includes the refrigerant pipe 27a and a coolant pipe 27b. The chiller 27 functions as an inter-media heat exchanger that allows the refrigerant to absorb the heat from the coolant flowing through the coolant pipe 27b of the low temperature circuit 3 to be described below, and evaporates the refrigerant. The refrigerant pipe 27a of the chiller 27 functions as an evaporator that evaporates the refrigerant. In addition, in the refrigerant pipe 27a of the chiller 27, by evaporation, the mist-like refrigerant having a low temperature and a low pressure and flowing out of the second expansion valve 25 is changed to the gaseous refrigerant having a low temperature and a low pressure. As a result, the coolant of the low temperature circuit 3 is cooled.

The first electromagnetic adjusting valve 28 and the second electromagnetic adjusting valve 29 are used for changing a flow mode of the refrigerant in the refrigeration circuit 2. As an opening degree of the first electromagnetic adjusting valve 28 is increased, an amount of refrigerant flowing into the evaporator flow path 2b is increased, and thus an amount of refrigerant flowing into the evaporator 26 is increased. In addition, as an opening degree of the second electromagnetic adjusting valve 29 is increased, an amount of the refrigerant flowing into the chiller flow path 2c is increased, and thus an amount of the refrigerant flowing into the chiller 27 is increased. Note that any valve may be provided in place of the electromagnetic adjusting valves 28, 29 as long as the flow rates from the refrigeration fundamental flow path 2a to the evaporator flow path 2b and the chiller flow path 2c can be adjusted.

Note that, in the present embodiment, the refrigeration circuit 2 includes solely the condenser 22 as a heat exchanger that dissipates the heat from the refrigerant in the refrigeration circuit 2 to the outside. However, the refrigeration circuit 2 may include another heat exchanger that dissipates the heat from the refrigerant to the outside (for example, outside air).

Low Temperature Circuit

Next, the low temperature circuit 3 will be described. The low temperature circuit 3 includes a first pump 31, a coolant pipe 27b for the chiller 27, a low temperature radiator 32, a first three-way valve 33, and a second three-way valve 34. In addition, the low temperature circuit 3 includes a battery heat exchanger 35, a PCU heat exchanger 36, and an MG heat exchanger 37. In the low temperature circuit 3, the coolant circulates through these components. Note that the coolant is an example of a second heat medium, and any heat medium may be used in place of the coolant in the low temperature circuit 3.

The low temperature circuit 3 includes a low temperature fundamental flow path 3a, a low temperature radiator flow path 3b, and a heat generation device flow path 3c. The low temperature radiator flow path 3b and the heat generation device flow path 3c are provided in parallel with each other, and each are connected to the low temperature fundamental flow path 3a.

In the low temperature fundamental flow path 3a, the first pump 31, the coolant pipe 27b of the chiller 27, and the battery heat exchanger 35 are provided in this order in the circulation direction of the coolant. In addition, a battery bypass flow path 3d provided to bypass the battery heat exchanger 35 is connected to the low temperature fundamental flow path 3a. The first three-way valve 33 is provided at a connection portion between the low temperature fundamental flow path 3a and the battery bypass flow path 3d.

In addition, the low temperature radiator 32 is provided in the low temperature radiator flow path 3b. The PCU heat exchanger 36 and the MG heat exchanger 37 are provided in this order in the heat generation device flow path 3c in the circulation direction of the coolant. In the heat generation device flow path 3c, a heat exchanger that exchanges the heat with a heat generation device other than the PCU or the MG may be provided. The second three-way valve 34 is provided between the low temperature fundamental flow path 3a, the low temperature radiator flow path 3b, and the heat generation device flow path 3c.

The first pump 31 pumps the coolant that circulates in the low temperature circuit 3. In the present embodiment, the first pump 31 is an electric water pump, and is configured such that a discharge capacity is changed in a non-step manner by adjusting the electric power supplied to the first pump 31.

The low temperature radiator 32 is a heat exchanger that exchanges the heat between the coolant that circulates in the low temperature circuit 3 and the air (outside air) outside the vehicle 100. The low temperature radiator 32 is configured to dissipate the heat from the coolant to the outside air when a temperature of the coolant is higher than a temperature of the outside air, and allow the coolant to absorb the heat from the outside air to when the temperature of the coolant is lower than the temperature of the outside air.

The first three-way valve 33 is configured to selectively allow the coolant flowing out of the coolant pipe 27b of the chiller 27 to flow between the battery heat exchanger 35 and the battery bypass flow path 3d. The second three-way valve 34 is configured to selectively allow the coolant flowing out of the low temperature fundamental flow path 3a to flow between the low temperature radiator flow path 3b and the heat generation device flow path 3c.

The battery heat exchanger 35 is configured to exchange the heat with the battery 120 of the vehicle 100. The PCU heat exchanger 36 is configured to exchange the heat with the PCU 118 of the vehicle 100. In addition, the MG heat exchanger 37 is configured to exchange the heat with the MG 112 of the vehicle 100.

Note that, in the present embodiment, the chiller 27 is provided in the refrigeration circuit 2 and the low temperature circuit 3, and the chiller 27 functions as an inter-media heat exchanger that transfers the heat from the coolant of the low temperature circuit 3 to the refrigerant of the refrigeration circuit 2. However, in the refrigeration circuit 2, in place of the chiller 27, a heat exchanger that exchanges the heat with gas in the atmosphere outside the vehicle and transfers the heat from the gas in the atmosphere to the refrigerant of the refrigeration circuit 2 may be provided. In this case, the low temperature circuit 3 is not provided in the in-vehicle temperature control system 1, so that the battery 120, the PCU 118, and the MG 112 are cooled by a mechanism other than the in-vehicle temperature control system 1.

High Temperature Circuit

Next, the high temperature circuit 4 will be described. The high temperature circuit 4 includes a second pump 41, a coolant pipe 22b of the condenser 22, a high temperature radiator 42, a heater core 43, a third three-way valve 44, a fourth three-way valve 45, and an engine heat circuit 5. Also in the high temperature circuit 4, the coolant circulates through these components. Note that the coolant is an example of a first heat medium, and any heat medium may be used in place of the coolant in the high temperature circuit 4.

In addition, the high temperature circuit 4 includes a first communication path 4a and a second communication path 4b.

The first communication path 4a communicates with the engine heat circuit 5 on the downstream side of the engine heat exchanger 52 to be described below and an outlet of the coolant pipe 22b of the condenser 22, and communicates with an inlet of the heater core 43 and an inlet of the high temperature radiator 42. Specifically, the first communication path 4a includes a condenser outflow path (fourth path) 4a1 that communicates with the outlet of the coolant pipe 22b of the condenser 22, an engine outflow path (fifth path) 4a2 that communicates with the engine heat circuit 5, a core inflow path (sixth path) 4a3 that communicates with the condenser outflow path 4a1 and the engine outflow path 4a2, and a further core inflow path 4a3' that communicates with the inlet of the heater core 43, and a radiator inflow path 4a4 that branches from the core inflow path 4a3 and communicates with the inlet of the high temperature radiator 42. Therefore, the first communication path 4a can allow the coolant flowing out of the engine heat circuit 5 and the coolant flowing out of the condenser 22 to flow into the heater core 43 and/or the high temperature radiator 42.

The second communication path 4b communicates with the outlet of the heater core 43 and the outlet of the high temperature radiator 42, and communicates with the engine heat circuit 5 and the inlet of the coolant pipe 22b of the condenser 22 on the upstream side of the engine heat exchanger 52. Specifically, the second communication path 4b includes a condenser inflow path (first path) 4b1 that communicates with the inlet of the coolant pipe 22b of the condenser 22, an engine inflow path (second path) 4b2 that communicates with the engine heat circuit 5, a core outflow path (third path) 4b3 that communicates with the condenser inflow path 4b1 and the engine inflow path 4b2, and communicates with the outlet of the heater core 43, and a radiator outflow path 4b4 that communicates with the outlet of the high temperature radiator 42 and the condenser inflow path 4b1. Therefore, the second communication path 4b can allow the coolant flowing out of the heater core 43 and the coolant flowing out of the high temperature radiator 42 to flow into the engine heat circuit 5 and/or the condenser 22.

Therefore, in the present embodiment, the high temperature circuit 4 includes the first communication path 4a that communicates with the engine heat circuit 5 on the downstream side of the engine heat exchanger 52, the outlet of the condenser 22, and the inlet of the heater core 43, and allows the coolant to flow from the engine heat circuit 5 and the condenser 22 to the heater core 43, and the second communication path 4b that communicates with the engine heat circuit 5 on the upstream side of the engine heat exchanger 52, the inlet of the condenser 22, and the outlet of the heater core 43, and allows the coolant to flow from the heater core 43 to the engine heat circuit 5 and the condenser 22.

The second pump 41 pumps the coolant that circulates in the high temperature circuit 4. In the present embodiment, the second pump 41 is an electric water pump similar to the first pump 31. In particular, in the present embodiment, the second pump 41 is provided in the condenser inflow path 4b1. In addition, the high temperature radiator 42 is a heat exchanger that exchanges the heat between the coolant that circulates in the high temperature circuit 4 and the outside air, similarly to the low temperature radiator 32.

The heater core 43 is used for performing heating of the vehicle cabin by using the heat of the coolant in the high temperature circuit 4. That is, the heater core 43 is configured to exchange the heat between the coolant that circulates in the high temperature circuit 4 and the air around the heater core 43 to warm the air around the heater core 43, and as a result, perform heating of the vehicle cabin. Specifically, the heater core 43 is configured to exhaust the heat from the coolant to the air around the heater core 43. Therefore, when the high temperature coolant flows through the heater core 43, the temperature of the coolant is decreased and the air around the heater core 43 is warmed.

The third three-way valve 44 is provided at a branch portion where the radiator inflow path 4a4 branches from the core inflow path 4a3. Therefore, the coolant flowing out of the condenser 22 to the condenser outflow path 4a1 of the first communication path 4a and the coolant flowing out of the engine heat circuit 5 to the engine outflow path 4a2 of the first communication path 4a flow into the third three-way valve 44. In addition, the third three-way valve 44 is switched between a first state where the core inflow path 4a3 and the further core inflow path 4a3' communicate with each other and a second state where the core inflow path 4a3 and the radiator inflow path 4a4 communicate with each other. When the third three-way valve 44 is put into the first state, all the coolant flowing into the third three-way valve 44 flows into the heater core 43. On the other hand, when the third three-way valve 44 is put into the second state, all the coolant flowing into the third three-way valve 44 flows into the high temperature radiator 42.

Note that, in the present embodiment, the third three-way valve 44 is configured to be switched between the first state and the second state. However, the third three-way valve 44 may also be switchable to an intermediate state between the first state and the second state. In this case, the third three-way valve 44 adjusts a ratio of a flow rate of the coolant, among the coolant flowing into the third three-way valve 44, flowing into the heater core 43 through the further core inflow path 4a3' to a flow rate of the coolant flowing into the high temperature radiator 42 through the radiator inflow path 4a4.

The fourth three-way valve 45 is provided at a branch portion where the core outflow path 4b3 branches into the condenser inflow path 4b1 and the engine inflow path 4b2. Therefore, the coolant flowing out of the heater core 43 to the core outflow path 4b3 flows into the fourth three-way valve 45.

FIGS. 3A to 3D are diagrams schematically showing different operation states of the fourth three-way valve 45. As shown in FIGS. 3A to 3D, the fourth three-way valve 45 includes a housing 45a and a valve body 45b that rotates in the housing 45a. The housing 45a has an inlet X that communicates with the core outflow path 4b3, a first outlet Y that communicates with the condenser inflow path 4b1, and a second outlet Z that communicates with the engine inflow path 4b2. The valve body 45b rotates in the housing 45a to change a communication state between the inlet X, the first outlet Y, and the second outlet Z.

Figure 3A:
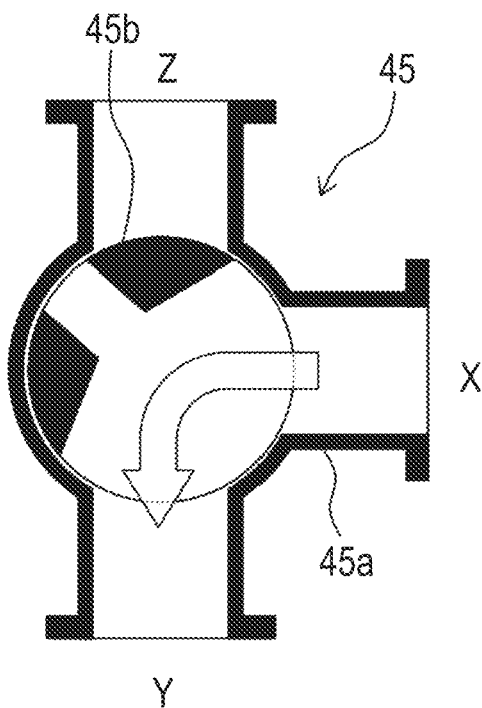
FIG. 3A is a diagram schematically showing different operation states of a fourth three-way valve.

When the valve body 45b of the fourth three-way valve 45 is put into the first state shown in FIG. 3A, the inlet X and the first outlet Y communicate with each other. Therefore, in this case, all the coolant flowing into the fourth three-way valve 45 (that is, the coolant flowing out of the heater core) flows into the condenser 22 through the condenser inflow path 4b1. On the other hand, when the valve body 45b of the fourth three-way valve 45 is put into the second state shown in FIG. 3B, the inlet X and the second outlet Z communicate with each other. Therefore, in this case, all the coolant flowing into the fourth three-way valve 45 flows into the engine heat circuit 5 through the engine inflow path 4b2.

Figure 3C:
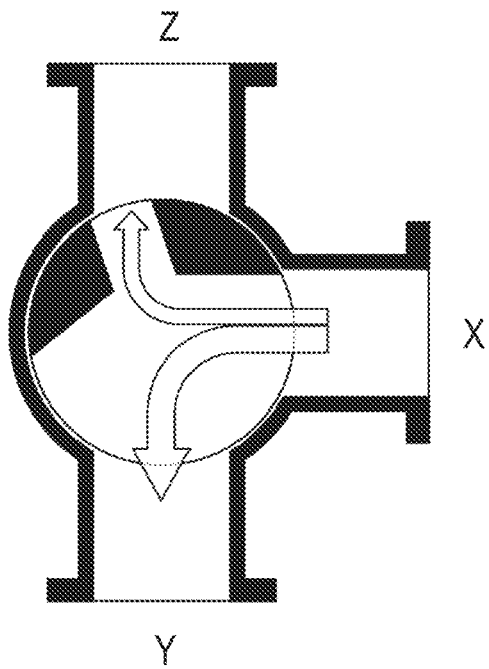
FIG. 3C is a diagram schematically showing different operation states of a fourth three-way valve.
Figure 3B:
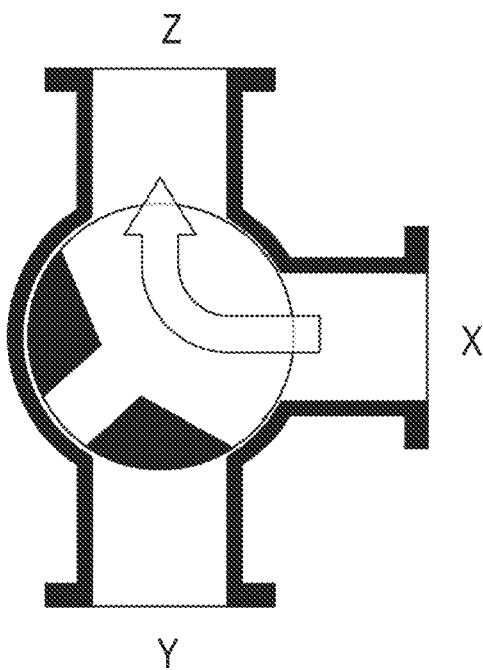
FIG. 3B is a diagram schematically showing different operation states of a fourth three-way valve.

In addition, when the fourth three-way valve 45 is put into a third state shown in FIG. 3C, the inlet X communicate with both the first outlet Y and the second outlet Z. Therefore, in this case, the coolant flowing into the fourth three-way valve 45 flows into both the condenser inflow path 4b1 and the engine inflow path 4b2. Note that an opening area of the path from the inlet X to the first outlet Y is larger than an opening area of the path from the inlet X to the second outlet Z. Therefore, a ratio of the coolant flowing into the condenser inflow path 4b1 is larger than a ratio of the coolant flowing into the engine inflow path 4b2.

Figure 3D:
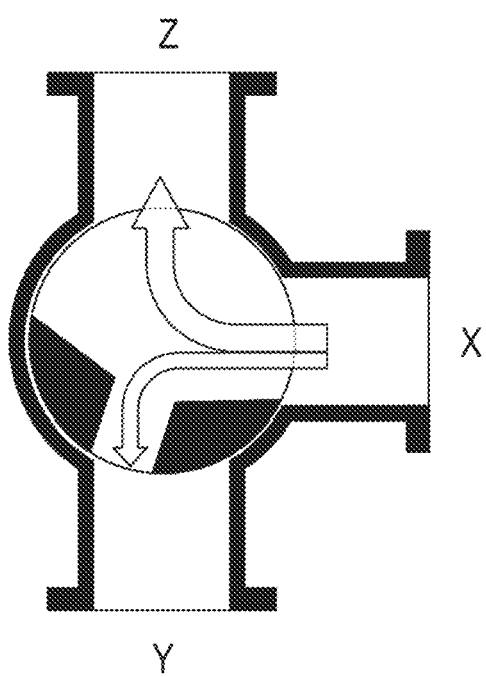
FIG. 3D is a diagram schematically showing different operation states of a fourth three-way valve.

Further, when the fourth three-way valve 45 is put into a fourth state shown in FIG. 3D, the inlet X communicate with both the first outlet Y and the second outlet Z. Note that, in the fourth state, the opening area of the path from the inlet X to the second outlet Z is larger than the opening area of the path from the inlet X to the first outlet Y. Therefore, in this case, the coolant flowing into the fourth three-way valve 45 flows into both the condenser inflow path 4b1 and the engine inflow path 4b2, but a ratio of the coolant flowing into the engine inflow path 4b2 is larger than a ratio of the coolant flowing into the condenser inflow path 4b1.

As described above, in the present embodiment, the fourth three-way valve 45 functions as an adjusting valve that adjusts the ratio of the flow rate of the coolant flowing into the condenser inflow path 4b1 from the core outflow path 4b3 to the flow rate of the coolant flowing into engine inflow path 4b2 from the core outflow path 4b3. That is, the fourth three-way valve 45 functions as an adjusting valve that stepwise adjusts the ratio of the flow rate of the coolant, among the coolant flowing into the fourth three-way valve 45, flowing into the condenser 22 through the condenser inflow path 4b1 to the flow rate of the coolant flowing into engine heat circuit 5 through the engine inflow path 4b2. Stated another way, the fourth three-way valve 45 functions as an adjusting valve that adjusts the ratio of the flow rate of the coolant, among the coolant flowing into the heater core 43, flowing out of the condenser 22 and flowing into the heater core 43 through the condenser outflow path 4a1 to the flow rate of the coolant flowing out of the engine heat circuit 5 and flowing into the heater core 43 through the engine outflow path 4a2.

Note that the fourth three-way valve 45 may be an adjusting valve that adjusts the ratio between the flow rates of the coolant flowing into the condenser 22 and the engine heat circuit 5 in multi-stages more than four stages shown in FIGS. 3A to 3D, or may be an adjusting valve that continuously adjusts the ratio between the flow rates of the coolant flowing into the condenser 22 and the engine heat circuit 5. In addition, in place of the fourth three-way valve 45, for example, two electromagnetic adjusting valves provided, respectively, in the condenser inflow path 4b1 and the engine inflow path 4b2 may be used as an adjusting valve that stepwise or continuously adjusts the ratio between the flow rates of the coolant flowing into the condenser 22 and the engine heat circuit 5.

Engine Heat Circuit

Next, the engine heat circuit 5 will be described. The engine heat circuit 5 is a heat circuit used for dissipating the heat generated in the internal combustion engine 110. The engine heat circuit 5 includes a third pump 51, the engine heat exchanger 52, an engine radiator 53, and a thermostat 54. In the engine heat circuit 5, the same coolant as the coolant in the high temperature circuit 4 circulates through these components. Therefore, the engine heat circuit 5 allows the coolant to flow through the engine heat exchanger 52 without passing through the coolant pipe 22b of the condenser 22, the high temperature radiator 42, and the heater core 43.

In addition, the engine heat circuit 5 is divided into an engine fundamental flow path 5a, an engine radiator flow path 5b, and an engine bypass flow path 5c. The engine radiator flow path 5b and the engine bypass flow path 5c are provided in parallel with each other, and each are connected to the engine fundamental flow path 5a.

The third pump 51 and the engine heat exchanger 52 are provided in this order in the engine fundamental flow path 5a in the circulation direction of the coolant. The engine radiator 53 is provided in the engine radiator flow path 5b. In addition, the engine outflow path 4a2 and the engine inflow path 4b2 communicate with the engine bypass flow path 5c. In particular, the engine outflow path 4a2 communicates with an upstream side portion of the engine bypass flow path 5c. As a result, the engine outflow path 4a2 communicates with a vicinity of the outlet of the engine heat exchanger 52. On the other hand, the engine inflow path 4b2 communicates with a downstream side portion of the engine bypass flow path 5c. As a result, the engine inflow path 4b2 communicates with a vicinity of the inlet of the engine heat exchanger 52. Therefore, the engine heat exchanger 52 is configured to communicate with the high temperature circuit 4 and allow the coolant of the high temperature circuit 4 to flow. The thermostat 54 is provided between the engine fundamental flow path 5a, the engine radiator flow path 5b, and the engine bypass flow path 5c. Note that, in the example shown in FIG. 2, the engine outflow path 4a2 communicates with the engine bypass flow path 5c, but may communicate with the engine fundamental flow path 5a or the like.

The third pump 51 pumps the coolant that circulates in the engine heat circuit 5. In the present embodiment, the third pump 51 is an electric water pump similar to the first pump 31. In addition, the engine radiator 53 is a heat exchanger that exchanges the heat between the coolant that circulates in the engine heat circuit 5 and the outside air, similarly to the low temperature radiator 32.

The engine heat exchanger 52 is used for heating the coolant by using the exhaust heat of the internal combustion engine 110. That is, the engine heat exchanger 52 exhausts the heat from the internal combustion engine 110 to the coolant in the engine heat circuit 5 to heat the coolant. The engine heat exchanger 52 suppresses the excessive temperature rise of the internal combustion engine 110 by dissipating the heat generated due to the combustion of the fuel in the internal combustion engine 110 to the coolant. The engine heat exchanger 52 is formed of, for example, a cylinder block of the internal combustion engine 110 or a coolant path provided in a cylinder head.

The thermostat 54 is a valve that is switched between a valve closed state where the coolant flowing through the engine radiator flow path 5b is blocked and a valve opened state where the coolant is permitted to flow through the engine radiator flow path 5b. The thermostat 54 is opened to allow the coolant to flow into the engine radiator flow path 5b when the temperature of the coolant that circulates through the engine bypass flow path 5c is equal to or higher than a preset temperature. The thermostat 54 is closed not to allow the coolant to flow into the engine radiator flow path 5b when the temperature of the coolant that circulates through the engine bypass flow path 5c is lower than a preset temperature. As a result, the temperature of the coolant that flows through the engine heat exchanger 52 is maintained at a substantially fixed temperature.

Air Path

Figure 4:
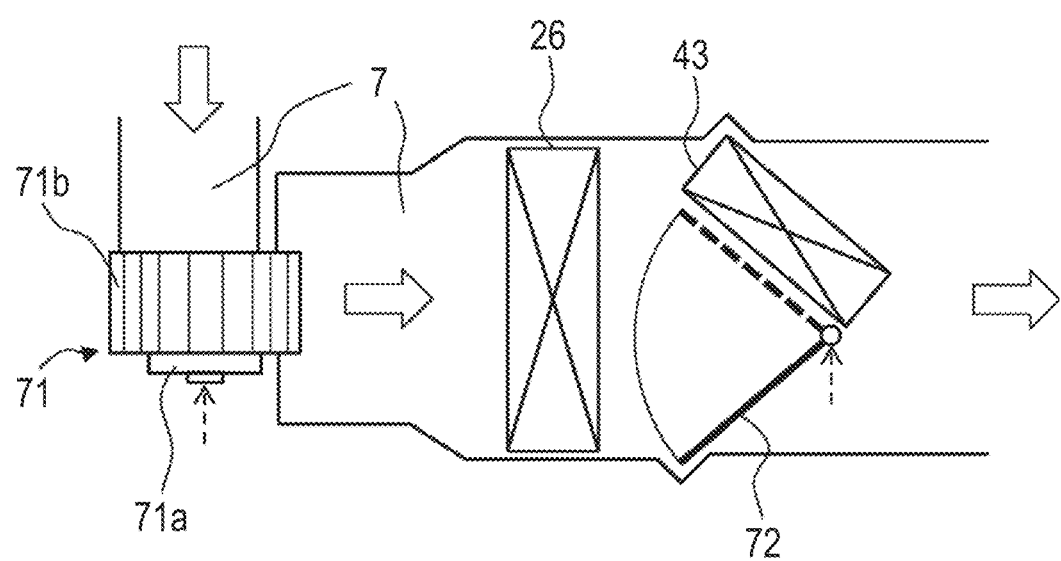
FIG. 4 is a configuration diagram schematically showing an air path for air conditioning of the vehicle equipped with the in-vehicle temperature control system.

FIG. 4 is a configuration diagram schematically showing an air path 7 for air conditioning of the vehicle 100 equipped with the in-vehicle temperature control system 1. In the air path 7, the air flows in a direction indicated by an arrow in FIG. 4. The air path 7 shown in FIGS. 3A to 3D is connected to the outside of the vehicle 100 or an air suction port of the vehicle cabin, and the outside air or the air inside the vehicle cabin flows into the air path 7 in accordance with a control state by the control device 6. In addition, the air path 7 shown in FIGS. 3A to 3D is connected to a plurality of blowout ports for blowing the air into the vehicle cabin, and the air is supplied from the air path 7 to any of the blowout ports in accordance with the control state by the control device 6.

As shown in FIG. 4, in the air path 7 for air conditioning according to the present embodiment, a blower 71, an evaporator 26, an air mix door 72, and a heater core 43 are provided in this order in a flow direction of air.

The blower 71 includes a blower motor 71a and a blower fan 71b. The blower 71 is configured such that outside air or the air inside the vehicle cabin flows into the air path 7 and the air flows through the air path 7, when the blower fan 71b is driven by the blower motor 71a. In a case where heating or cooling of the vehicle cabin is requested, the blower fan 71b is basically driven.

The air mix door 72 adjusts a flow rate of the air flowing through the heater core 43 among the air flowing through the air path 7. The air mix door 72 is configured to be adjusted between a state where all the air flowing through the air path 7 flows through the heater core 43, a state where all the air flowing through the air path 7 does not flow through the heater core 43, and an intermediate state.

In the air path 7 configured in this way, in a case where the blower 71 is driven, when the refrigerant circulates in the evaporator 26, the air flowing through the air path 7 is cooled. In addition, in a case where the blower 71 is driven, when the coolant circulates in the heater core 43 and the air mix door 72 is controlled such that the air flows through the heater core 43, the air flowing through the air path 7 is warmed.

In addition, as shown in FIG. 1, the low temperature radiator 32, the high temperature radiator 42, and the engine radiator 53 are disposed inside a front grille of the vehicle 100. Therefore, when the vehicle 100 travels, the radiators 32, 42, 53 are exposed to traveling wind. In addition, a fan 76 is provided adjacent to the radiators 32, 42, 53. The radiators 32, 42, 53 are configured to be exposed to the wind when the fan 76 is driven. Therefore, even when the vehicle 100 does not travel, the radiators 32, 42, 53 can be exposed to the wind by driving the fan 76.

Control Device

With reference to FIG. 2, the control device 6 includes an electronic control unit (ECU) 61. The ECU 61 includes a processor that performs various operations, a memory that stores programs or various information, and an interface that is connected to various actuators or various sensors.

In addition, the control device 6 is provided in the engine fundamental flow path 5a or the engine bypass flow path 5c, and includes a first coolant temperature sensor 62 that detects the temperature of the coolant in the engine heat circuit 5, particularly the temperature of the coolant flowing out of the engine heat exchanger 52. In addition, the control device 6 is provided in the further core inflow path 4a3', and includes a second coolant temperature sensor 63 that detects the temperature of the coolant flowing into the heater core 43. The ECU 61 is connected to the sensors 62, 63, and the output signals from the sensors 62, 63 are input to the ECU 61.

In addition, the control device 6 includes an indoor temperature sensor 66 that detects an indoor temperature of the vehicle 100, an outside air temperature sensor 67 that detects an outdoor temperature of the vehicle 100, and an operation panel 68 operated by a user. The ECU 61 is connected to the sensors 66, 67 and the operation panel 68, and the output signals from the sensors 66, 67 and the operation panel 68 are input to the ECU 61.

The ECU 61 determines the presence or absence of a cooling request or a heating request based on the output signals from the sensors 66, 67 and the operation panel 68. For example, in a case where the user turns on a heating switch of the operation panel 68, the ECU 61 determines that heating is requested. In addition, in a case where the user turns on an auto switch of the operation panel 68, for example, when the indoor temperature set by the user is higher than the temperature detected by the indoor temperature sensor 66, the ECU 61 determines that heating is requested.

In addition, the ECU 61 is connected to various actuators of the in-vehicle temperature control system 1, and controls these actuators. Specifically, the ECU 61 is connected to the compressor 21, the electromagnetic adjusting valves 28, 29, the pumps 31, 41, 51, the three-way valves 33, 34, 44, 45, the blower motor 71a, the air mix door 72, and the fan 76, and controls these components. Therefore, the ECU 61 functions as a control device that controls a flow state of the heat medium (refrigerant and coolant) in the refrigeration circuit 2, the low temperature circuit 3, and the high temperature circuit 4 (including the engine heat circuit 5).

Operation of In-Vehicle Temperature Control System

Next, with reference to FIGS. 5 to 8, the flow state of the heat medium (refrigerant and coolant) in a case where heating is requested for the in-vehicle temperature control system 1 will be described. In FIGS. 5 to 8, the flow path through which the refrigerant or the coolant flows is shown by a solid line, and the flow path through which the refrigerant or the coolant does not flow is shown by a broken line. In addition, a thin arrow in the figure indicates a direction in which the refrigerant or the coolant flows, and a thick arrow in the figure indicates a direction in which the heat is transferred.

First Heating Mode

Figure 5:
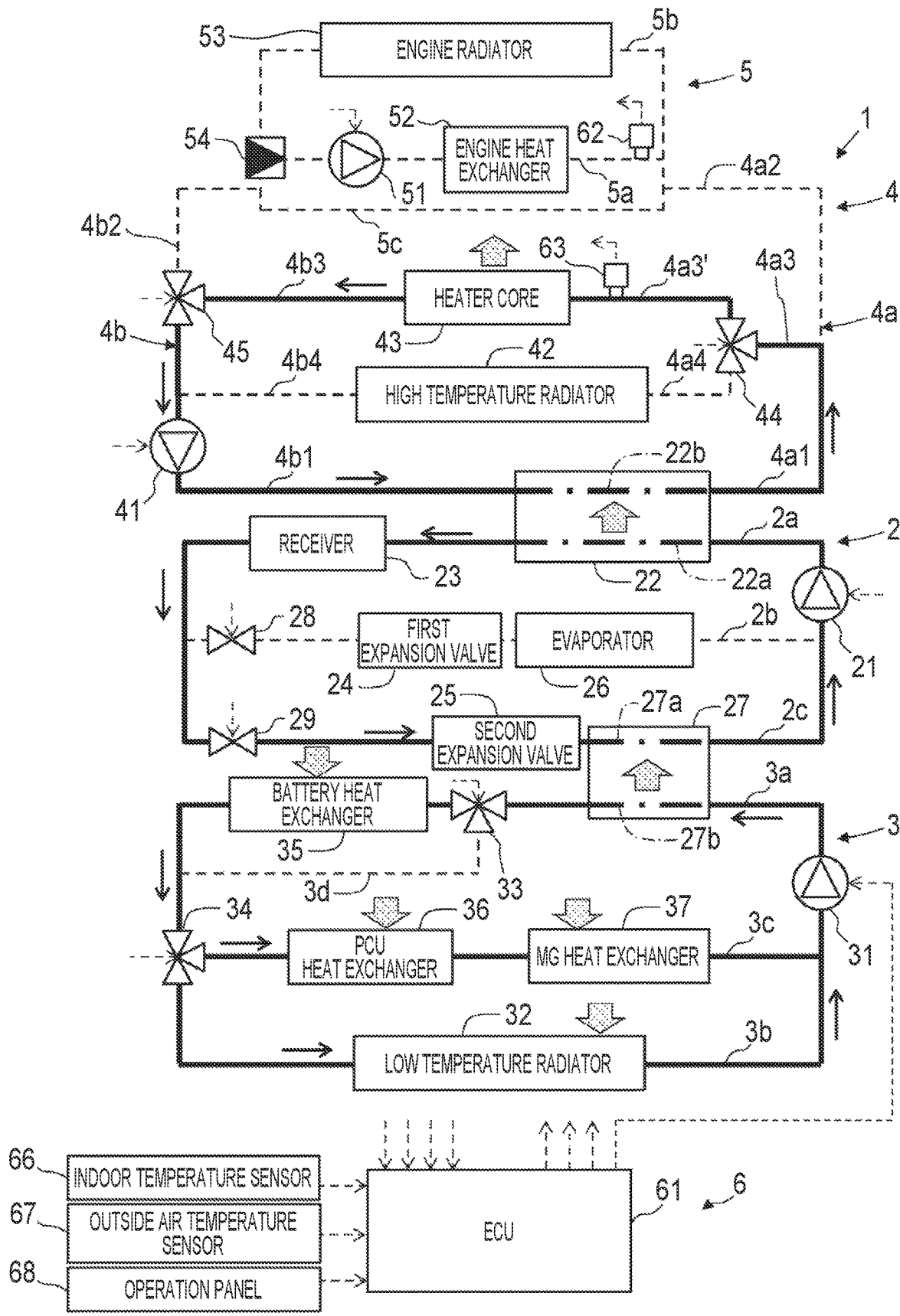
FIG. 5 shows a flow state (first heating mode) of a heat medium in the in-vehicle temperature control system in a case where a heating request is present and an internal combustion engine is stopped.

FIG. 5 shows the flow state (first heating mode) of the heat medium in the in-vehicle temperature control system 1 in a case where the heating request is present and the internal combustion engine 110 is stopped. In the first heating mode, heating is performed by the heater core 43 by using the heat obtained from the refrigeration circuit 2 in place of the heat obtained from the internal combustion engine 110.

As shown in FIG. 5, in the first heating mode, the compressor 21 of the refrigeration circuit 2 is operated, the first electromagnetic adjusting valve 28 is closed, and the second electromagnetic adjusting valve 29 is opened. Therefore, in the refrigeration circuit 2, the refrigerant circulates through the chiller 27 without passing through the evaporator 26. Note that, in the first heating mode, in order to also perform dehumidification, the first electromagnetic adjusting valve 28 may be opened and the refrigerant may flow through the evaporator 26 as well.

In addition, in the first heating mode, the first pump 31 of the low temperature circuit 3 is operated. In addition, in the first heating mode, the first three-way valve 33 is set such that the coolant flows through the battery heat exchanger 35, and the second three-way valve 34 is set such that the coolant flows through both the low temperature radiator flow path 3b and the heat generation device flow path 3c. As a result, in the low temperature circuit 3, the coolant circulates through the coolant pipe 27b of the chiller 27, the low temperature radiator 32, the battery heat exchanger 35, the PCU heat exchanger 36, and the MG heat exchanger 37. Note that, in the first heating mode, in accordance with the need for cooling the battery 120, the PCU 118, and the MG 112, the first three-way valve 33 may be set such that the coolant flows through the battery bypass flow path 3d, and the second three-way valve 34 may be set such that the coolant solely flows any one of the low temperature radiator flow path 3b and the heat generation device flow path 3c.

Further, in the first heating mode, the second pump 41 of the high temperature circuit 4 is operated. In addition, in the first heating mode, the third three-way valve 44 is set to the first state such that the coolant flows into the heater core 43, and the fourth three-way valve 45 is set to the first state (FIG. 3A) such that the coolant flows into the condenser inflow path 4b1. As a result, in the high temperature circuit 4, the coolant circulates through the heater core 43 and the coolant pipe 22b of the condenser 22. Stated another way, in the high temperature circuit 4, the coolant does not flow into the heater core 43 from the engine heat circuit 5, but flows into the heater core 43 from the condenser 22.

As a result, in the first heating mode, in the low temperature circuit 3, the heat is absorbed by the coolant from the outside air in the low temperature radiator 32, and in some cases, the heat is absorbed by the coolant from the battery 120, the PCU 118, and the MG 112 in the battery heat exchanger 35, the PCU heat exchanger 36, and the MG heat exchanger 37, respectively. Moreover, the heat is transferred from the coolant of the low temperature circuit 3 to the refrigerant in the chiller 27. In the refrigeration circuit 2, the heat is absorbed by the refrigerant in the chiller 27, and the heat is transferred from the refrigerant to the coolant in the high temperature circuit 4 in the condenser 22. Therefore, the refrigeration circuit 2 functions as a heat pump that dissipates, by the condenser 22, the heat absorbed by the chiller 27 or the like.

Moreover, in the first heating mode, in the high temperature circuit 4, the heat is absorbed by the coolant of the high temperature circuit 4 in the condenser 22, and the heat is dissipated in the heater core 43. Therefore, in the first heating mode, the heat is absorbed from the outside air by the low temperature radiator 32, and in some cases, the heat is absorbed from the battery 120, the PCU 118 and the MG 112 in the battery heat exchanger 35, the PCU heat exchanger 36, and the MG heat exchanger 37, respectively, and the heat is dissipated in the heater core 43. Stated another way, the heater core 43 performs heating by using the heat obtained by the refrigeration cycle.

Second Heating Mode

Figure 6:
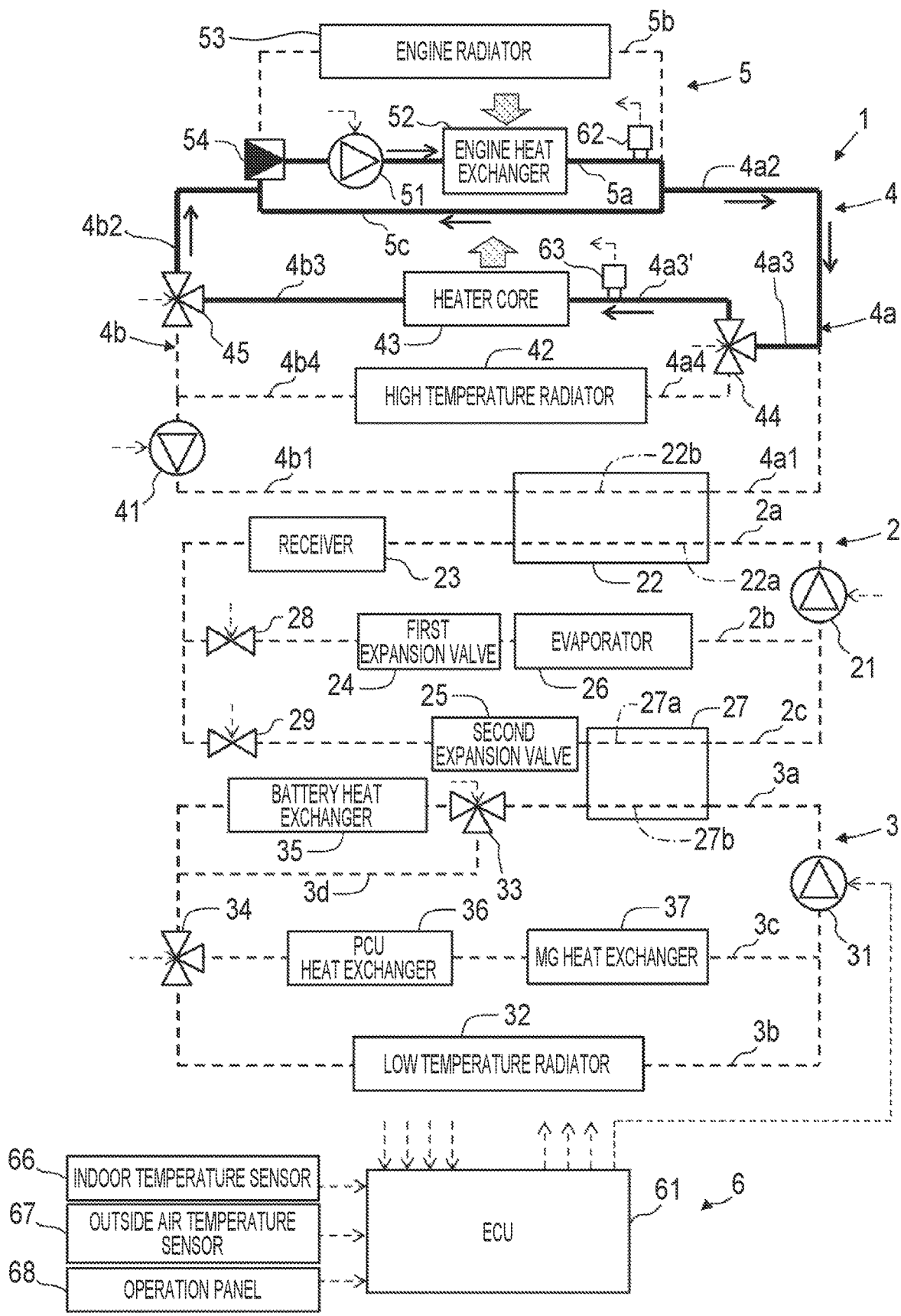
FIG. 6 shows a flow state (second heating mode) of the heat medium in the in-vehicle temperature control system in a case where the heating request is present and the internal combustion engine is operated.

FIG. 6 shows the flow state (second heating mode) of the heat medium in the in-vehicle temperature control system 1 in a case where the heating request is present and the internal combustion engine 110 is operated. In particular, in the second heating mode, heating is performed by the heater core 43 by using the heat obtained from the internal combustion engine 110 in place of the heat obtained from the refrigeration circuit 2. In this case, since the vehicle 100 is basically driven by the internal combustion engine 110, it is not basically needed to cool the MG 112 or the like.

As shown in FIG. 6, in the second heating mode, the compressor 21 of the refrigeration circuit 2 and the first pump 31 are stopped. Therefore, the refrigerant does not circulate in the refrigeration circuit 2, and the coolant does not circulate in the low temperature circuit 3.

Note that, in the second heating mode, the first pump 31 may be operated. In this case, the coolant circulates through the low temperature radiator 32 and the battery heat exchanger 35, or the coolant circulates through the low temperature radiator 32, the battery heat exchanger 35, the PCU heat exchanger 36, and the MG heat exchanger 37. As a result, the heat is absorbed by the coolant from the battery 120, the PCU 118, and the MG 112 in the battery heat exchanger 35, the PCU heat exchanger 36, and the MG heat exchanger 37, and the heat is dissipated to the atmosphere in the low temperature radiator 32.

In addition, in the second heating mode, the second pump 41 of the high temperature circuit 4 is stopped, and the third pump 51 of the engine heat circuit 5 is operated. In addition, the third three-way valve 44 is set to the first state such that the coolant flows into the heater core 43, and the fourth three-way valve 45 is set to the second state (FIG. 3B) such that the coolant flows into the engine heat circuit 5. As a result, in the high temperature circuit 4, by the third pump 51, the coolant circulates through the engine heat circuit 5 and the heater core 43. Stated another way, in the high temperature circuit 4, the heat medium does not flow into the heater core 43 from the condenser 22, but the heat medium flows into the heater core 43 from the engine heat circuit 5. Note that, in the example shown in FIG. 6, although the coolant does not flow through the engine radiator flow path 5b, the thermostat 54 is opened in accordance with the temperature of the coolant in the engine heat circuit 5, and the coolant flows into the engine radiator flow path 5b as well.

As a result, in the second heating mode, the heat is absorbed from the internal combustion engine 110 in the engine heat exchanger 52, and the heat is dissipated in the heater core 43. Therefore, the heater core 43 performs heating by using the heat obtained from the internal combustion engine 110. In addition, in the second heating mode, since the refrigerant does not circulate in the refrigeration circuit 2, the heat is not dissipated from the refrigerant to the coolant of the high temperature circuit 4 in the condenser 22, so that the refrigeration circuit 2 does not function as a heat pump.

As described above, in the present embodiment, an inflow source of the coolant to the heater core 43 can be switched between the condenser 22 and the engine heat circuit 5 solely by switching the fourth three-way valve 45, so that heating using the refrigeration cycle (heat pump) and heating using the exhaust heat of the internal combustion engine 110 can be easily switched. Therefore, with the in-vehicle temperature control system 1 according to the present embodiment, two modes of heating can be performed with a simple configuration.

Transition Mode

Next, a change of the flow state of the heat medium in the in-vehicle temperature control system 1 while the flow state of the heat medium of the in-vehicle temperature control system 1 is changed from the first heating mode shown in FIG. 5 to the second heating mode shown in FIG. 6 will be described. In particular, in the present embodiment, the flow state is changed in order of a first transition mode, a second transition mode, and a third transition mode while the flow state is changed from the first heating mode to the second heating mode.

Figure 7:
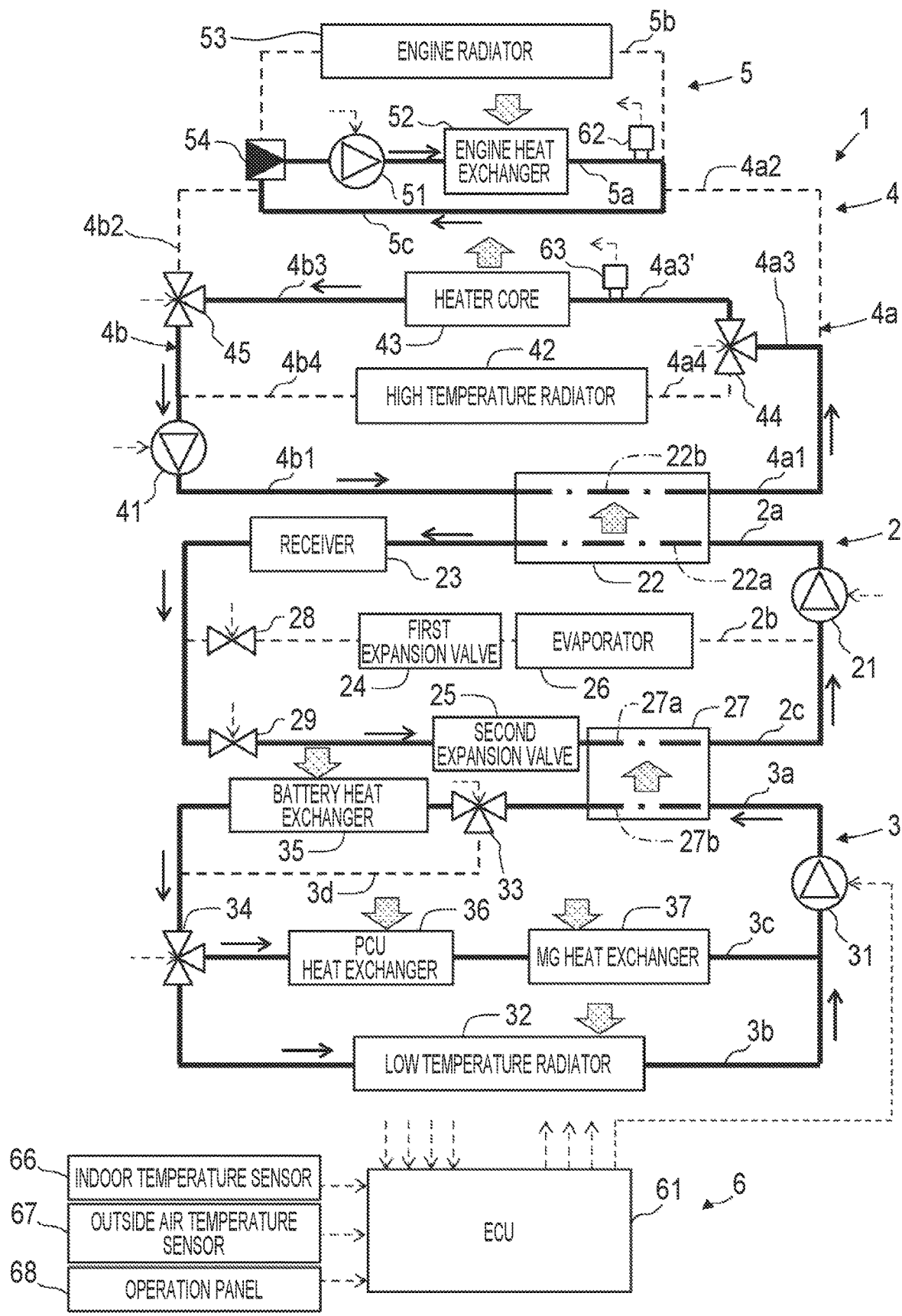
FIG. 7 shows a flow state of the heat medium in the in-vehicle temperature control system in a first transition mode.

FIG. 7 shows the flow state of the heat medium in the in-vehicle temperature control system 1 in the first transition mode. The first transition mode shown in FIG. 7 is a flow state adopted when the stopped internal combustion engine 110 is cold-started.

As shown in FIG. 7, in the first transition mode, the in-vehicle temperature control system 1 is basically operated in the same manner as in the first heating mode. Therefore, in the high temperature circuit 4, the second pump 41 is operated, the third three-way valve 44 is set to the first state, and the fourth three-way valve 45 is set to the first state (FIG. 3A). As a result, the heat is absorbed by the coolant in the condenser 22, and the heat is dissipated in the heater core 43.

In addition, in the first transition mode, the third pump 51 of the engine heat circuit 5 is operated due to the operation of the internal combustion engine 110. Therefore, the coolant circulates in the engine heat circuit 5. Note that since the fourth three-way valve 45 is set to the first state (FIG. 3A), the coolant does not flow into the engine heat circuit 5 from the engine inflow path 4b2, so that the coolant does not flow of the engine heat circuit 5 to the engine outflow path 4a2.

When the coolant circulates in the engine heat circuit 5 due to the operation of the internal combustion engine 110 in this way, the heat is absorbed from the internal combustion engine 110 in the engine heat exchanger 52. Therefore, the temperature of the coolant in the engine heat circuit 5 that is low before the operation of the internal combustion engine 110 gradually rises. On the other hand, the coolant does not flow through the engine outflow path 4a2 or the engine inflow path 4b2. Therefore, the temperature of the coolant in the engine outflow path 4a2 and the engine inflow path 4b2 is maintained at a low temperature.

Figure 8:
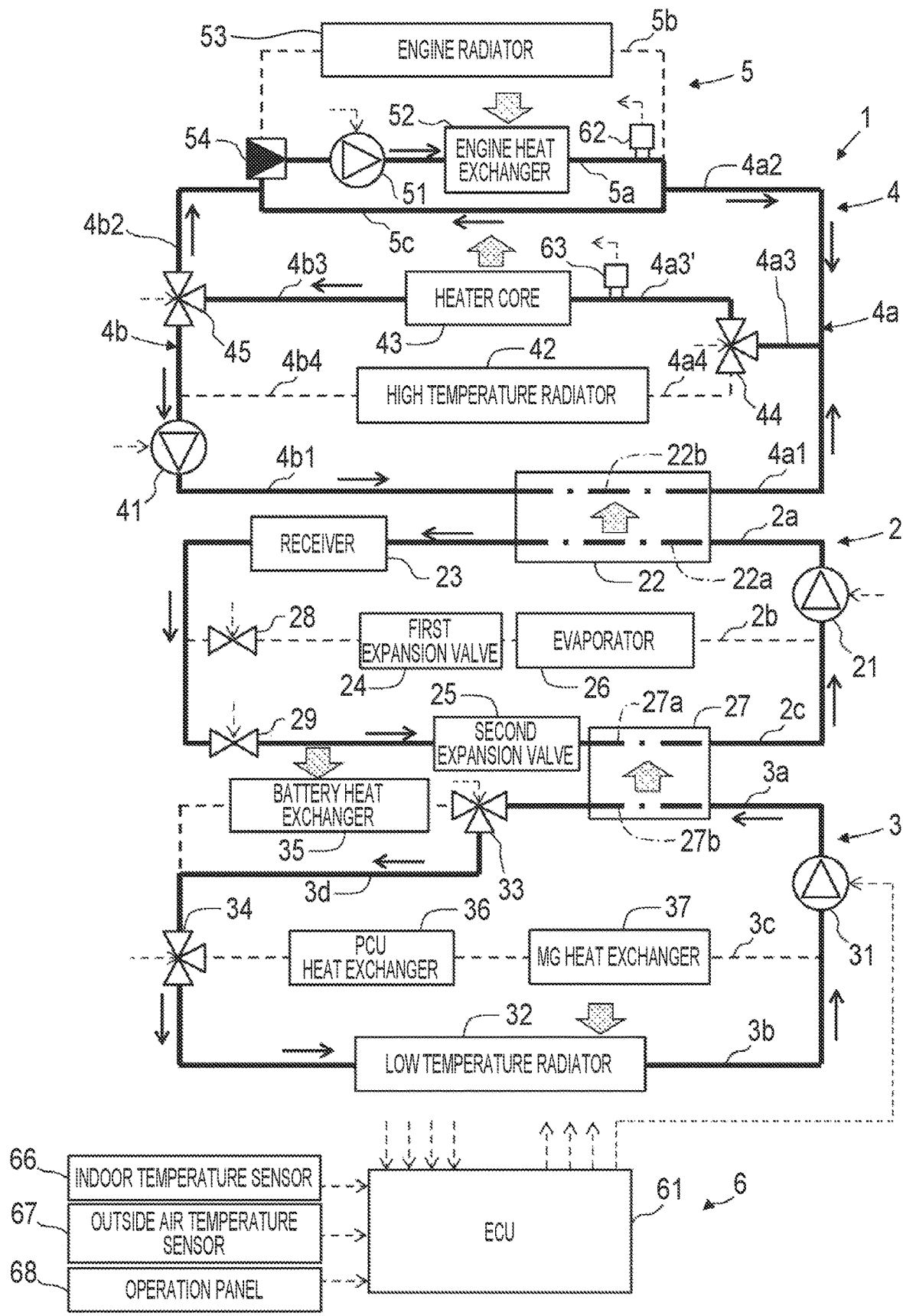
FIG. 8 shows a flow state of the heat medium in the in-vehicle temperature control system in a second transition mode.

FIG. 8 shows the flow state of the heat medium in the in-vehicle temperature control system 1 in the second transition mode. The second transition mode is a flow state adopted after the temperature of the coolant in the engine heat circuit 5 rises to some extent by the first transition mode.

In the second transition mode, the refrigerant circulates in the refrigeration circuit 2 in the same manner as in the first heating mode. In addition, in the second transition mode, the first pump 31 of the low temperature circuit 3 is operated. In addition, in the second transition mode, the first three-way valve 33 is set such that the coolant flows through the battery bypass flow path 3d, and the second three-way valve 34 is set such that the coolant flows through the low temperature radiator flow path 3b. As a result, in the low temperature circuit 3, the coolant circulates through the coolant pipe 27b of the chiller 27 and the low temperature radiator 32. This is because the vehicle 100 is driven by the internal combustion engine 110, so that it is not needed to drive the vehicle 100 by the MG 112, the PCU 118, the MG 112, and the battery 120 basically do not generate the heat, and thus it is not needed to cool these components.

In addition, in the second transition mode, the second pump 41 of the high temperature circuit 4 is operated. In addition, in the second transition mode, the third three-way valve 44 is set to the first state such that the coolant flows into the heater core 43, and the fourth three-way valve 45 is set such that the coolant flows into both the condenser inflow path 4b1 and the engine inflow path 4b2. In particular, the fourth three-way valve 45 is set to the third state such that the ratio of the coolant flowing into the condenser inflow path 4b1 is larger than the ratio of the coolant flowing into the engine inflow path 4b2.

Therefore, in the second transition mode, a part of the coolant flowing out of the heater core 43 flows into the condenser inflow path 4b1, and the remaining part flows into the engine inflow path 4b2. In this case, the flow rate of the coolant flowing into the condenser inflow path 4b1 is larger than the flow rate of the coolant flowing into the engine inflow path 4b2. As a result, in the second transition mode, the coolant flows into the heater core 43 from the condenser 22 through the condenser outflow path 4a1, and the coolant flows into the heater core 43 from the engine heat circuit 5 through the engine outflow path 4a2. In this case, the flow rate of the coolant flowing into the heater core 43 from the condenser 22 is larger than the flow rate of the coolant flowing into the heater core 43 from the engine heat circuit 5.

As a result, a large amount of the coolant heated by the condenser 22 flows into the heater core 43. In addition, the relatively low-temperature coolant staying in the engine outflow path 4a2 or the coolant that is not sufficiently heated in the engine heat circuit 5 flows into the heater core 43. However, since an amount of the coolant flowing from the engine heat circuit 5 through the engine outflow path 4a2 is small, the temperature of the coolant does not drop so much even when the coolant heated by the condenser 22 merges with the coolant having passed through the engine outflow path 4a2. Therefore, also in the second transition mode, the relatively high-temperature coolant flows into the heater core 43, so that heating can be effectively performed.

The third transition mode is basically the same flow state of the heat medium as the second transition mode. Note that, in the third transition mode, the fourth three-way valve 45 of the high temperature circuit 4 is set to the fourth state such that the ratio of the coolant flowing into the engine inflow path 4b2 is larger than the ratio of the coolant flowing into the condenser inflow path 4b1.

Therefore, also in the third transition mode, a part of the coolant flowing out of the heater core 43 flows into the condenser inflow path 4b1, and the remaining part flows into the engine inflow path 4b2. In this case, the flow rate of the coolant flowing into the engine inflow path 4b2 is larger than the flow rate of the coolant flowing into the condenser inflow path 4b1. As a result, in the third transition mode, the coolant flows into the heater core 43 from the condenser 22 through the condenser outflow path 4a1, and the coolant flows into the heater core 43 from the engine heat circuit 5 through the engine outflow path 4a2. In this case, the flow rate of the coolant flowing into the heater core 43 from the engine heat circuit 5 is larger than the flow rate of the coolant into the heater core 43 flowing from the condenser 22.

As a result, a small amount of the high temperature coolant that is heated by the condenser 22 flows into the heater core 43. In addition, a large amount of the coolant in the engine heat circuit 5 flows into the heater core 43. In this case, the coolant in the engine heat circuit 5 is heated to some extent by the internal combustion engine 110 via the engine heat exchanger 52, and the relatively high-temperature coolant also flows into the engine outflow path 4a2. Therefore, the temperature of the coolant flowing into the heater core 43 from the engine heat circuit 5 through the engine outflow path 4a2 is not so low. However, such coolant does not have a temperature high enough to perform heating of the heater core 43. In the third transition mode, such coolant merges with the coolant heated by the condenser 22, so that the coolant having a temperature high enough to perform heating flows into the heater core 43.

Therefore, in the present embodiment, when the fourth three-way valve 45 is switched from the first state (FIG. 3A) to the second state (FIG. 3B) to switch the flow state from the first heating mode to the second heating mode, the fourth three-way valve 45 is controlled such that a ratio of the flow rate of the coolant, among the coolant flowing into the heater core 43, flowing out of the engine heat circuit 5 to the flow rate of the coolant flowing out of the condenser 22 is increased in four stages (in order of the first heating mode, the second transition mode, the third transition mode, and the second heating mode). As a result, as described above, when the flow state is switched, excessive lowering of the temperature of the coolant flowing into the heater core 43 due to the low temperature coolant staying in the engine outflow path 4a2 is suppressed, and thus temporary decrease in a heating effect due to the heater core 43 is suppressed.

Note that, in the present embodiment, when the flow state is switched from the first heating mode to the second heating mode, the ratio of the flow rate of the coolant is changed in four stages. However, as described above, in a case where the adjusting valve that can adjust the ratio of the flow rate of the coolant in multi-stages more than four stages or continuously is provided in place of the fourth three-way valve 45, when the flow state is switched from the first heating mode to the second heating mode, the ratio of the flow rate of the coolant may be changed in multi-stages more than four stages or continuously.

Control of Three-Way Valve

As described above, a control of the fourth three-way valve 45 is performed by the ECU 61. Basically, when a first heating condition that heating by the heater core 43 is performed by using the heat obtained by the refrigeration cycle is satisfied, the ECU 61 controls the flow state of the heat medium in the in-vehicle temperature control system 1 to the first heating mode as described above. The first heating condition is satisfied, for example, when the internal combustion engine 110 is stopped, and when the temperature of the coolant in the engine heat circuit 5 is lower than a reference temperature (for example, 50° C.) even when the internal combustion engine 110 is operated.

In addition, when a second heating condition that heating by the heater core 43 is performed by using the heat obtained by the internal combustion engine 110 is satisfied, the ECU 61 controls the flow state of the heat medium in the in-vehicle temperature control system 1 to the second heating mode as described above. The second heating condition is satisfied, for example, when the internal combustion engine 110 is operated and the temperature of the coolant in the engine heat circuit 5 is equal to or higher than the reference temperature.

Figure 9:
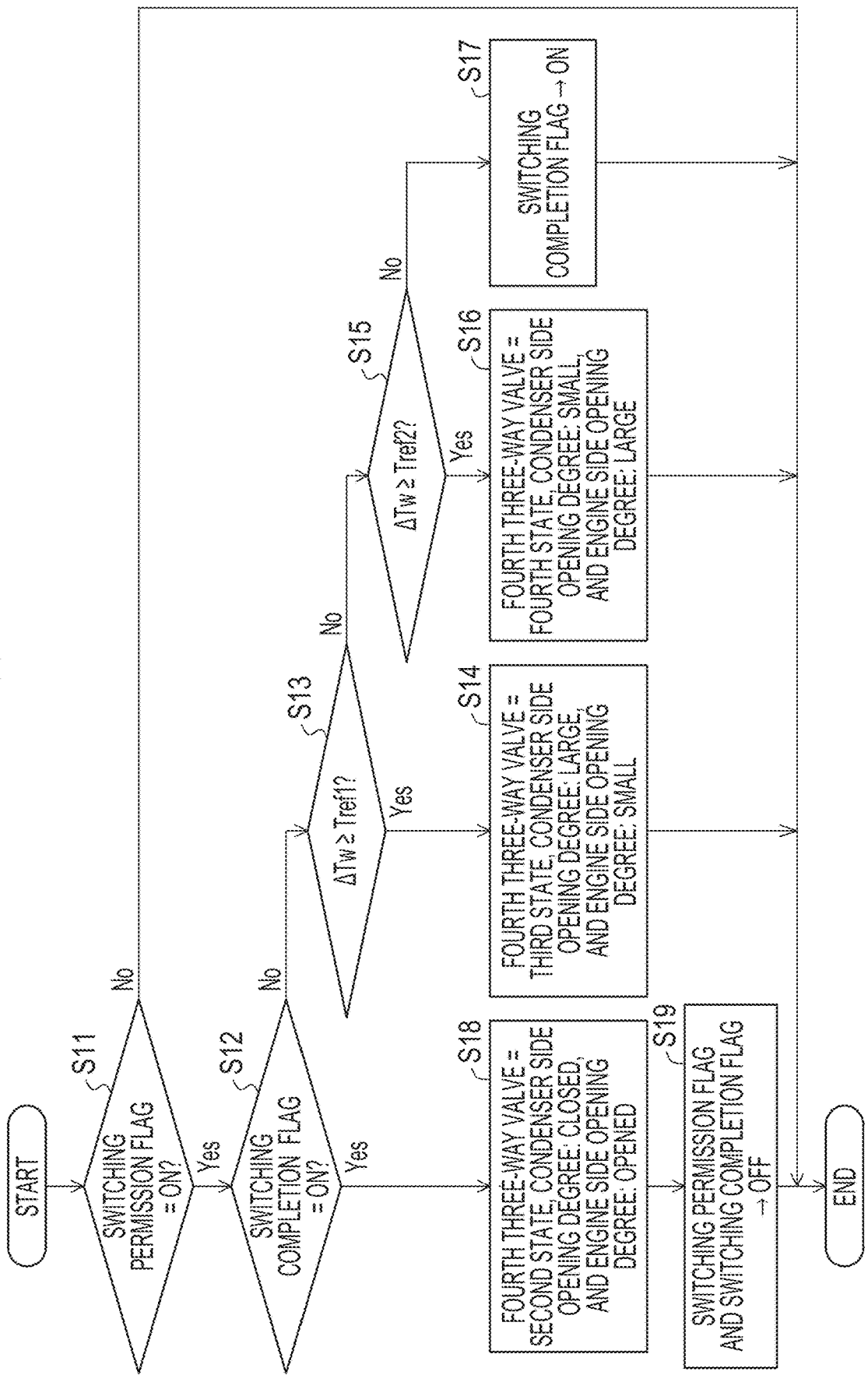
FIG. 9 is a flowchart showing a flow of switching processing of the fourth three-way valve by an ECU.

Note that, even in a case where the second heating condition is satisfied when the in-vehicle temperature control system 1 is operated in the first heating mode, the ECU 61 does not immediately change the flow state of the heat medium in the in-vehicle temperature control system 1 to the second heating mode, but performs switching stepwise. In the following, a switching control of the fourth three-way valve 45 by the ECU 61 will be described with reference to FIG. 9. FIG. 9 is a flowchart showing a flow of switching processing of the fourth three-way valve 45 by the ECU 61. The shown switching processing is performed at regular time intervals.

First, the ECU 61 determines whether or not a switching permission flag is set to ON (step S11). The switching permission flag is a flag set to ON in a state where the heating request is present and the flow state of the heat medium in the in-vehicle temperature control system 1 is put into the first heating mode, when the stopped internal combustion engine 110 is started and the temperature of the coolant in the engine heat circuit 5 is equal to or higher than a predetermined switching start temperature (for example, 50° C.). Therefore, when the switching permission flag is switched from OFF to ON, the flow state of the heat medium in the in-vehicle temperature control system 1 is put into the first transition mode. The temperature of the coolant in the engine heat circuit 5 is detected by the first coolant temperature sensor 62. In a case where a determination is made in step S11 that the switching permission flag is not set to ON, switching of the fourth three-way valve 45 is not performed by the present switching processing.

In a case where a determination is made in step S11 that the switching permission flag is set to ON, the ECU 61 determines whether or not a switching completion flag is set to ON (step S12). When switching of the fourth three-way valve 45 is completed, the switching completion flag is set to ON. In addition, the switching completion flag is set to OFF when the second heating condition is not satisfied, for example, due to the stoppage of the internal combustion engine 110 and lowering of the temperature of the coolant in the engine heat circuit 5.

When a determination is made in step S12 that the switching completion flag is set to OFF, the ECU 61 determines whether or not a temperature difference $\Delta Tw$ obtained by subtracting the temperature of the coolant flowing into the heater core 43 from the temperature of the coolant in the engine heat circuit 5 is equal to or larger than a first reference value Tref1 (step S13). The temperature of the coolant in the engine heat circuit 5 is detected by the first coolant temperature sensor 62, and the temperature of the coolant flowing into the heater core 43 is detected by the second coolant temperature sensor 63. In addition, the first reference value Tref1 is, for example, a temperature at which the low temperature coolant flows into the heater core 43 and the heating effect is decreased when the temperature difference is equal to or larger than the first reference value Tref1, and is, for example, 10° C. Note that it is preferable that the first reference value Tref1 be small from the viewpoint of the heating effect, when the first reference value Tref1 is too small, a stop time of the compressor 21 of the refrigeration circuit 2 is delayed, so that the first reference value Tref1 is experimentally determined in consideration of the delay of the stop time.

In a case where a determination is made in step S13 that the temperature difference $\Delta Tw$ is equal to or larger than the first reference value Tref1, that is, when a determination is made that the temperature of the coolant flowing into the heater core 43 is low, the ECU 61 sets the operation state of the fourth three-way valve 45 to the third state (step S14). Therefore, the fourth three-way valve 45 is set such that the opening degree to the condenser inflow path 4b1 is larger than the opening degree to the engine inflow path 4b2. As a result, the flow state of the heat medium in the in-vehicle temperature control system 1 is put into the second transition mode.

On the other hand, in a case where a determination is made in step S13 that the temperature difference $\Delta Tw$ is less than the first reference value Tref1, the ECU 61 determines whether or not the temperature difference $\Delta Tw$ is equal to or less than a second reference value Tref2 (step S15). The second reference value Tref2 is a temperature lower than the first reference value Tref1, and is, for example, 5° C. It is also preferable that the second reference value Tref2 be small from the viewpoint of the heating effect, when the second reference value Tref2 is too small, a stop time of the compressor 21 of the refrigeration circuit 2 is delayed, so that the second reference value Tref2 is experimentally determined in consideration of the delay of the stop time. In a case where a determination is made in step S15 that the temperature difference $\Delta Tw$ is equal to or larger than the second reference value Tref2, that is, when a determination is made that the temperature of the coolant flowing into the heater core 43 is slightly low, the ECU 61 sets the operation state of the fourth three-way valve 45 to the fourth state (step S16). Therefore, the fourth three-way valve 45 is set such that the opening degree to the condenser inflow path 4b1 is smaller than the opening degree to the engine inflow path 4b2. As a result, the flow state of the heat medium in the in-vehicle temperature control system 1 is put into the third transition mode. On the other hand, in a case where a determination is made in step S15 that the temperature difference $\Delta Tw$ is less than the second reference value Tref2, the ECU 61 sets the switching completion flag to ON (step S17).

When the switching completion flag is set to ON in step S17, a determination is made that the switching completion flag is set to ON in step S12 in the next switching processing, and the ECU 61 sets the operation state of the fourth three-way valve 45 to the second state (step S18). Therefore, the fourth three-way valve 45 is set such that the opening degree to the condenser inflow path 4b1 is fully closed and the opening degree to the engine inflow path 4b2 is fully opened. As a result, the flow state of the heat medium in the in-vehicle temperature control system 1 is put into the second heating mode. Moreover, the switching permission flag and the switching completion flag are set to OFF (step S19). Thereafter, while the second heating condition that heating by the heater core 43 is performed by using the heat obtained from the internal combustion engine 110 is satisfied, the operation state of the fourth three-way valve 45 remains set to the second state.

As described above, in the present embodiment, the operation state of the fourth three-way valve 45 is switched stepwise in accordance with the temperature difference ΔTw between the temperature of the coolant at the inlet of the heater core 43 and the temperature of the coolant in the engine heat circuit 5. Specifically, the fourth three-way valve 45 is controlled such that the ratio of the flow rate of the coolant, among the coolant flowing into the heater core 43, flowing out of the engine heat circuit 5 to the flow rate of the coolant flowing out of the condenser 22 is increased stepwise as the temperature difference ΔTw is decreased. In this way, by controlling the fourth three-way valve 45 in accordance with the temperature of the coolant, it is possible to switch the heating mode as well as to appropriately maintain the heating effect of the heater core 43. Note that, in order to reduce the temporary change of the heating effect, it is preferable that the first reference value Tref1 and the second reference value Tref2 be small, but when the first reference value Tref1 and the second reference value Tref2 are too small, the refrigeration circuit 2 is delayed in stopping and the electric power consumption is increased, so that the first reference value Tref1 and the second reference value Tref2 are experimentally determined in consideration of the delay of the stop time.

Note that, in the present embodiment, the fourth three-way valve 45 is controlled based on the temperature difference ΔTw between the temperature of the coolant at the inlet of the heater core 43 and the temperature of the coolant in the engine heat circuit 5. However, in a case where the heating effect of the heater core 43 can be appropriately maintained, in place of the temperature difference ΔTw, the fourth three-way valve 45 may be controlled based on the temperature of the coolant flowing into the heater core 43, an elapsed time from the start of switching of the heating mode, or the like.

MODIFICATION EXAMPLE

Figure 10:
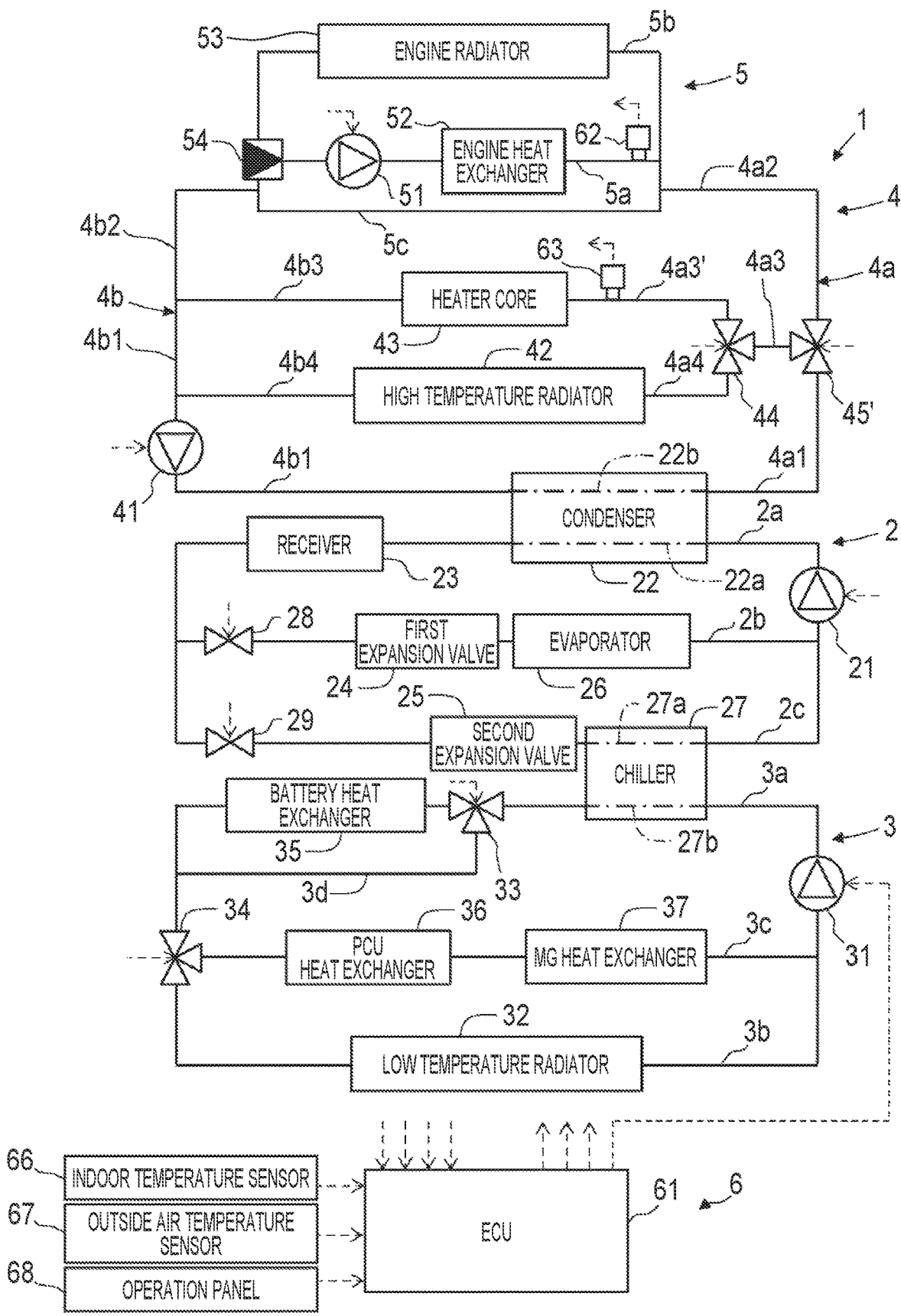
FIG. 10 is a configuration diagram schematically showing the in-vehicle temperature control system according to a first modification example.

Next, a modification example of the in-vehicle temperature control system 1 will be described with reference to FIGS. 10 to 12. FIG. 10 is a configuration diagram schematically showing the in-vehicle temperature control system 1 according to a first modification example. As shown in FIG. 10, the in-vehicle temperature control system 1 according to the first modification example has basically the same configuration as the in-vehicle temperature control system 1 according to the embodiment described above, except for the disposition of a fourth three-way valve 45'.

As shown in FIG. 10, in the first modification example, the fourth three-way valve 45' is provided at a communication portion between the condenser outflow path 4a1, the engine outflow path 4a2, and the core inflow path 4a3. Therefore, the coolant flowing out of the condenser 22 and the engine heat circuit 5 flows into the fourth three-way valve 45', and the inflow coolant flows out to the core inflow path 4a3.

FIGS. 11A to 11D are diagrams schematically showing different operation states of the fourth three-way valve 45' according to the present modification example. As shown in FIGS. 11A to 11D, the fourth three-way valve 45' according to the present modification example basically has the same configuration as the fourth three-way valve according to the embodiment described above. Note that, in the present modification example, an outlet X communicates with the core inflow path (sixth path) 4a3 and the further inflow path 4a3' that communicates with the heater core 43, a first inlet Y communicates with the condenser outflow path (fourth path) 4a1 that communicates with the outlet of the condenser 22, and a second inlet Z communicates with the engine outflow path (fifth path) 4a2.

Figure 11A:
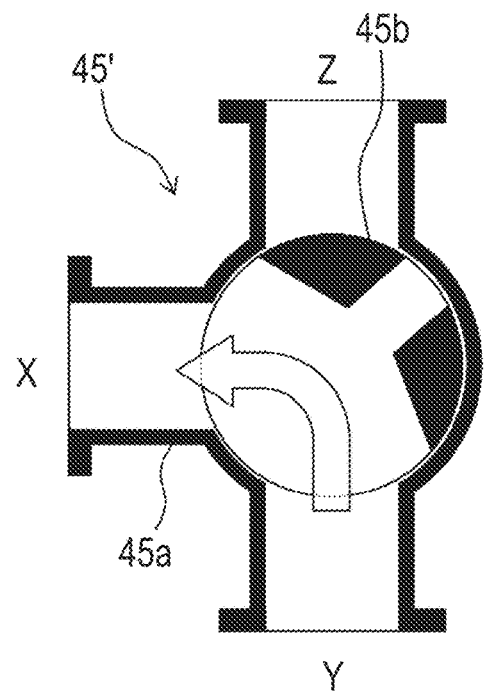
FIG. 11A is a diagram schematically showing different operation states of the fourth three-way valve according to the first modification example.
Figure 11B:
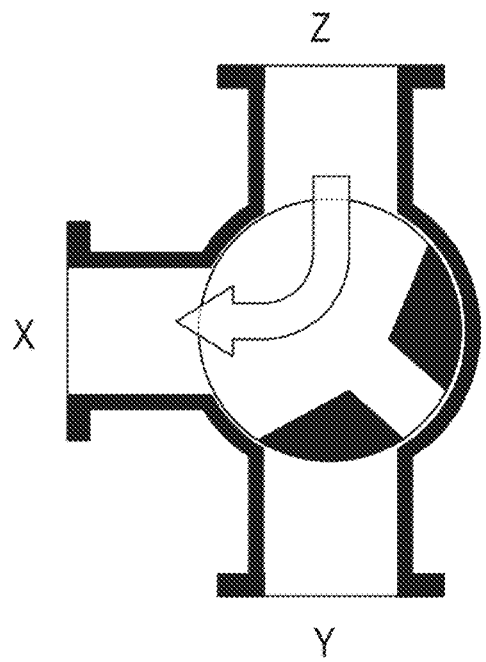
FIG. 11B is a diagram schematically showing different operation states of the fourth three-way valve according to the first modification example.
Figure 11C:
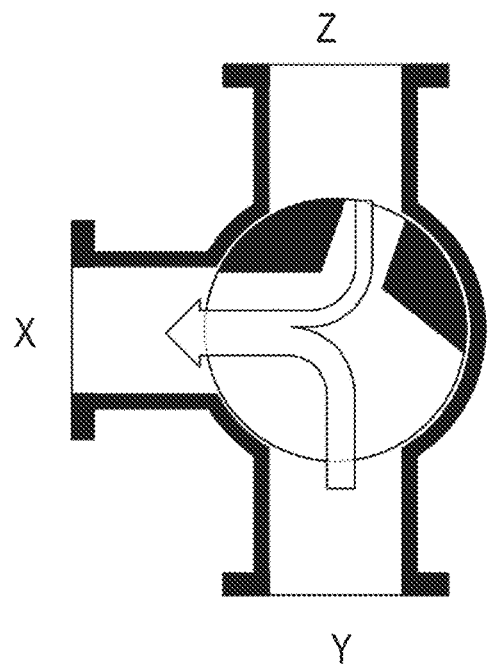
FIG. 11C is a diagram schematically showing different operation states of the fourth three-way valve according to the first modification example.
Figure 11D:
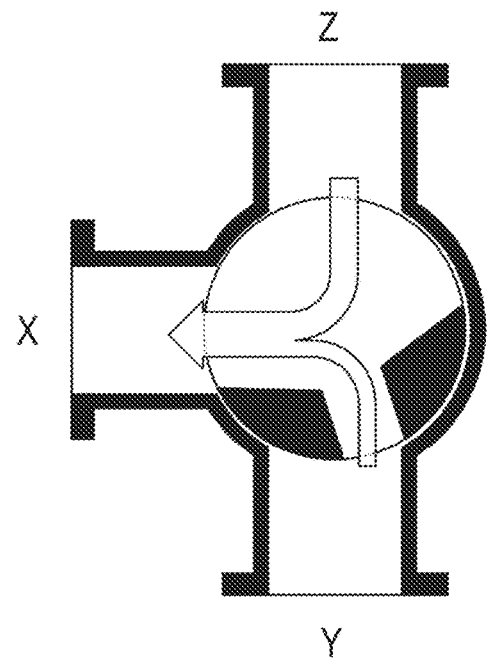
FIG. 11D is a diagram schematically showing different operation states of the fourth three-way valve according to the first modification example.

Therefore, when the fourth three-way valve 45' is put into the first state shown in FIG. 11A, the coolant flowing out of the condenser 22 flows into the heater core 43. In addition, when the fourth three-way valve 45' is put into the second state shown in FIG. 11B, the coolant flowing out of the engine heat circuit 5 flows into the heater core 43. In addition, when the fourth three-way valve 45' is put into the third state shown in FIG. 11C, the coolant flowing out of both the condenser 22 and the engine heat circuit 5 flows into the heater core 43, but the coolant flowing out of the condenser 22 flows into the heater core 43 in a larger amount. Further, also when the fourth three-way valve 45' is put into the fourth state shown in FIG. 11D, the coolant flowing out of both the condenser 22 and the engine heat circuit 5 flows into the heater core 43, but the coolant flowing out of the engine heat circuit 5 flows into the heater core 43 in a larger amount.

Therefore, in the present modification example, the fourth three-way valve 45' functions as an adjusting valve that adjusts the ratio of the flow rate of the coolant flowing into the core inflow path 4a3 from the condenser outflow path 4a1 to the flow rate of the coolant flowing into the core inflow path 4a3 from the engine outflow path 4a2. Therefore, also in the present modification example, the fourth three-way valve 45' functions as an adjusting valve that adjusts the ratio of the flow rate of the coolant, among the coolant flowing into the heater core 43, flowing out of the condenser 22 and flowing into the heater core 43 through the condenser outflow path 4a1 to the flow rate of the coolant flowing out of the engine heat circuit 5 and flowing into the heater core 43 through the engine outflow path 4a2.

Also in the in-vehicle temperature control system 1 according to the first modification example configured in this way, when the heating mode is switched, the fourth three-way valve 45' is switched in order of the first state, the third state, the fourth state, and the second state, as in the embodiment described above.

FIG. 12 is a configuration diagram schematically showing the in-vehicle temperature control system 1 according to a second modification example. As shown in FIG. 12, the in-vehicle temperature control system 1 according to the second modification example has basically the same configuration as the in-vehicle temperature control system 1 according to the embodiment described above, except for the disposition of a radiator inflow path 4a4' and a third three-way valve 44'.

As shown in FIG. 12, the radiator inflow path 4a4' communicates with the condenser outflow path 4a1 in place of the core inflow path 4a3. In addition, the third three-way valve 44' is provided at a branch portion from the condenser outflow path 4a1 to the core inflow path 4a3.

Even in such a configuration, the fourth three-way valve 45 adjusts the ratio of the flow rate of the coolant, among the coolant flowing into the heater core 43, flowing out of the condenser 22 and flowing into the heater core 43 through the condenser outflow path 4a1 to the flow rate of the coolant flowing out of the engine heat circuit 5 and flowing into the heater core 43 through the engine outflow path 4a2.

Although one embodiment and the modification examples have been described above, the present disclosure is not limited to the embodiment, and various modifications and changes can be made within the scope of the claims.

What is claimed is:

1. An in-vehicle temperature control system comprising:
    a refrigeration circuit including an inter-media heat exchanger that dissipates heat from a refrigerant to a heat medium and condenses the refrigerant, and an evaporator that allows the refrigerant to absorb heat and evaporates the refrigerant, the refrigeration circuit being configured as a refrigeration cycle by allowing the refrigerant to circulate through the inter-media heat exchanger and the evaporator;
    a heat circuit including a heater core used for heating a vehicle cabin, the inter-media heat exchanger, and an engine heat circuit, the heat circuit being configured to allow the heat medium to circulate through the heater core, the inter-media heat exchanger, and the engine heat circuit; and
    a control device configured to control a flow state of the heat medium in the heat circuit, wherein:
    the engine heat circuit is configured to allow the heat medium to flow through an engine heat exchanger that exchanges heat with an internal combustion engine without passing through the heater core and the inter-media heat exchanger;
    the heat circuit includes
        a first communication path communicating with the engine heat circuit on a downstream side of the engine heat exchanger, an outlet of the inter-media heat exchanger, and an inlet of the heater core, and allowing the heat medium to flow from the engine heat circuit and the inter-media heat exchanger into the heater core,
        a second communication path communicating with the engine heat circuit on an upstream side of the engine heat exchanger, an inlet of the inter-media heat exchanger, and an outlet of the heater core, and allowing the heat medium to flow from the heater core into the engine heat circuit and the inter-media heat exchanger, and
        an adjusting valve configured to adjust a ratio of a flow rate of a heat medium, among the heat media flowing into the heater core, flowing out of the inter-media heat exchanger and flowing into the heater core through the first communication path and a flow rate of a heat medium flowing out of the engine heat circuit and flowing into the heater core through the first communication path; and
    the control device is configured to
        when a first heating condition that heating by the heater core is performed by using heat obtained by the refrigeration cycle is satisfied, control the adjusting valve to a first state where the heat medium does not flow into the heater core from the engine heat circuit and the heat medium flows into the heater core from the inter-media heat exchanger, and
        when a second heating condition that heating by the heater core is performed by using heat obtained by the internal combustion engine is satisfied, control the adjusting valve to a second state where the heat medium does not flow into the heater core from the inter-media heat exchanger and the heat medium flows into the heater core from the engine heat circuit.

2. The in-vehicle temperature control system according to claim 1, wherein the control device is configured to, when the adjusting valve is switched from the first state to the second state, control the adjusting valve such that the ratio of the flow rate of the heat medium, among the heat media flowing into the heater core, flowing out of the engine heat circuit to the flow rate of the heat medium flowing out of the inter-media heat exchanger is increased stepwise or continuously.

3. The in-vehicle temperature control system according to claim 2, wherein the control device is configured to control the adjusting valve such that the ratio of the flow rate of the heat medium, among the heat media flowing into the heater core, flowing out of the engine heat circuit to the flow rate of the heat medium flowing out of the inter-media heat exchanger is increased as a difference between a temperature of the heat medium at the inlet of the heater core and a temperature of the heat medium in the engine heat circuit is decreased.

4. The in-vehicle temperature control system according to claim 1, wherein:
    the second communication path includes
        a third path communicating with the outlet of the heater core, and
        a first path and a second path communicating with the third path, and communicating with the inlet of the inter-media heat exchanger and the engine heat circuit, respectively; and
    the adjusting valve is configured to adjust a ratio of a flow rate of a heat medium flowing into the first path from the third path and a flow rate of a heat medium flowing into the second path from the third path.

5. The in-vehicle temperature control system according to claim 1, wherein:
    the first communication path includes
        a fourth path communicating with the outlet of the inter-media heat exchanger,
        a fifth path communicating with the engine heat circuit, and
        a sixth path communicating with the fourth path and the fifth path, and communicating with the inlet of the heater core; and
    the adjusting valve is configured to adjust a ratio of a flow rate of a heat medium flowing into the sixth path from the fourth path and a flow rate of a heat medium flowing into the sixth path from the fifth path.

* * * * *